(12) United States Patent
Molin et al.

(10) Patent No.: US 12,070,032 B2
(45) Date of Patent: Aug. 27, 2024

(54) PHYTOSTEROL-BASED AGRICULTURAL COMPOSITION AND THEIR USE

(71) Applicant: Elicit Plant, Moulins-sur-Tardoire (FR)

(72) Inventors: Aymeric Molin, St. Sornin (FR); Solange Villette, Moulins-sur-Tardoire (FR); Charlène Boussiron, Moulins-sur-Tardoire (FR)

(73) Assignee: ELICIT PLANT, Moulins-sur-Tardoire (FR)

( * ) Notice: Subject to any disclaimer, the term of this patent is extended or adjusted under 35 U.S.C. 154(b) by 0 days.

(21) Appl. No.: 18/448,055

(22) Filed: Aug. 10, 2023

(65) Prior Publication Data

US 2024/0023545 A1 Jan. 25, 2024

Related U.S. Application Data

(63) Continuation of application No. PCT/EP2022/077984, filed on Oct. 7, 2022.

(30) Foreign Application Priority Data

Oct. 8, 2021 (EP) .................................... 21306420

(51) Int. Cl.
*A01N 25/04* (2006.01)
*A01N 31/06* (2006.01)
*A01P 21/00* (2006.01)

(52) U.S. Cl.
CPC ............. *A01N 31/06* (2013.01); *A01N 25/04* (2013.01); *A01P 21/00* (2021.08)

(58) Field of Classification Search
CPC ........ A01N 45/00; A01N 25/30; A01N 25/04; A01N 25/02; A01N 49/00; A01N 43/16; A01N 24/04; A01N 31/06
See application file for complete search history.

(56) References Cited

U.S. PATENT DOCUMENTS

| | | | |
|---|---|---|---|
| 11,779,019 | B2 | 10/2023 | Fregonese et al. |
| 2016/0295868 | A1 | 10/2016 | Jones et al. |
| 2016/0302423 | A1 | 10/2016 | Jones et al. |
| 2020/0163335 | A1 | 5/2020 | Fregonese et al. |
| 2020/0163338 | A1 | 5/2020 | Fregonese et al. |
| 2023/0165254 | A1 | 6/2023 | Molin et al. |

FOREIGN PATENT DOCUMENTS

| | | | | |
|---|---|---|---|---|
| CA | 2687367 A1 | * | 12/2008 | ........... A23D 7/0053 |
| CN | 103563929 A | | 2/2014 | |
| CN | 106889068 A | | 6/2017 | |
| EP | 200371 A1 | | 11/1986 | |
| EP | 289636 A1 | | 11/1988 | |
| EP | 2183959 A1 | | 5/2010 | |
| FR | 3069756 A1 | | 2/2019 | |
| FR | 3069757 A1 | | 2/2019 | |
| JP | S5157556 A | | 5/1976 | |
| JP | H0789808 A | | 4/1995 | |
| KR | 20110124174 A | | 11/2011 | |
| WO | WO-2002017892 A2 | | 3/2002 | |
| WO | WO-2018229710 A1 | | 12/2018 | |
| WO | WO-2019030442 A1 | | 2/2019 | |
| WO | WO-2019030443 A1 | | 2/2019 | |
| WO | WO-2021214406 A1 | | 10/2021 | |

OTHER PUBLICATIONS

European Chemical Agency, (2022). "Plant Sterols, CAS No. 949109-75-5," available online at <https://echa.europa.eu/registration-dossier/-/registered-dossier/14742>, 19 pages.
Fawzia et al., (2016). "B-Sitosterol Ameliorates The Chemical Constituents Of Sunflower (*Helianthus annuus* L.) Plants, Grown Under Saline Condition," IOSR-JPBS, 11(3):36-45.
Griebel et al., (2010). "A role for beta-sitosterol to stigmasterol conversion in plant-pathogen interactions," The Plant Journal, 63:254-268.
International Search Report and Written Opinion dated Dec. 14, 2018, of International Patent Application No. PCT/FR2018/051932, 26 pages. English translation.
International Search Report and Written Opinion dated Oct. 12, 2018, for International Patent Application No. PCT/FR2018/051931, 26 pages. English translation.
International Search Report and Written Opinion dated Aug. 30, 2021 for International Patent Application No. PCT/FR2021/050683, 12 pages. English translation.
International Search Report and Written Opinion dated Feb. 1, 2023 for International Patent Application No. PCT/EP2022/077984, 10 pages.
Kopewicz, (1969). "Influence of steroids on the growth of the dwarf pea," Naturwissenschaflen, 56(5):287, 1 page.
Steber, (2001). "A Role for Brassinosteroids in Germination in *Arabidopsis*," Plant Physiology, 125(2):763-769.
Vriet et al., (2012). "Boosting Crop Yields with Plant Steroids," The Plant Cell, 24:842-857.

* cited by examiner

*Primary Examiner* — Johann R Richter
*Assistant Examiner* — Danielle Johnson
(74) *Attorney, Agent, or Firm* — Morrison & Foerster LLP

(57) ABSTRACT

Multiphase agricultural composition in the form of a suspo-emulsion, comprising lipophilic droplets containing a mixture of phytosterols, said lipophilic droplets being dispersed in an aqueous phase, the composition further comprising: at least one first surfactant (SF1) located at the interface of the lipophilic droplets and of the aqueous phase and selected from among the SFs that are soluble in the aqueous phase (WATER SF1) and the SFs that are soluble in the lipophilic droplets (OIL SF1); and at least one second surfactant (SF2) suspended in the aqueous phase, said second surfactant having the form of particles insoluble in the aqueous phase.

33 Claims, 4 Drawing Sheets

[Fig. 1]
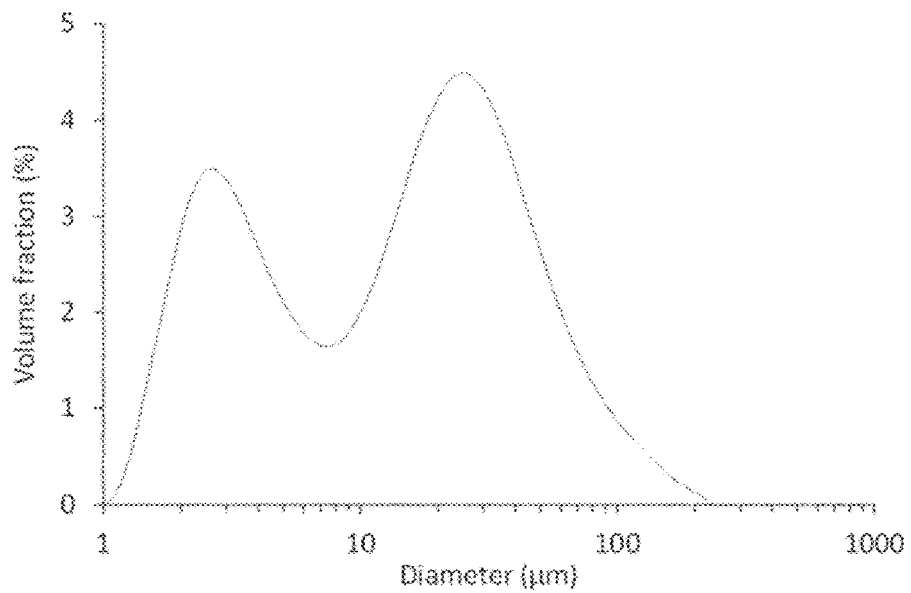
[Fig. 2]
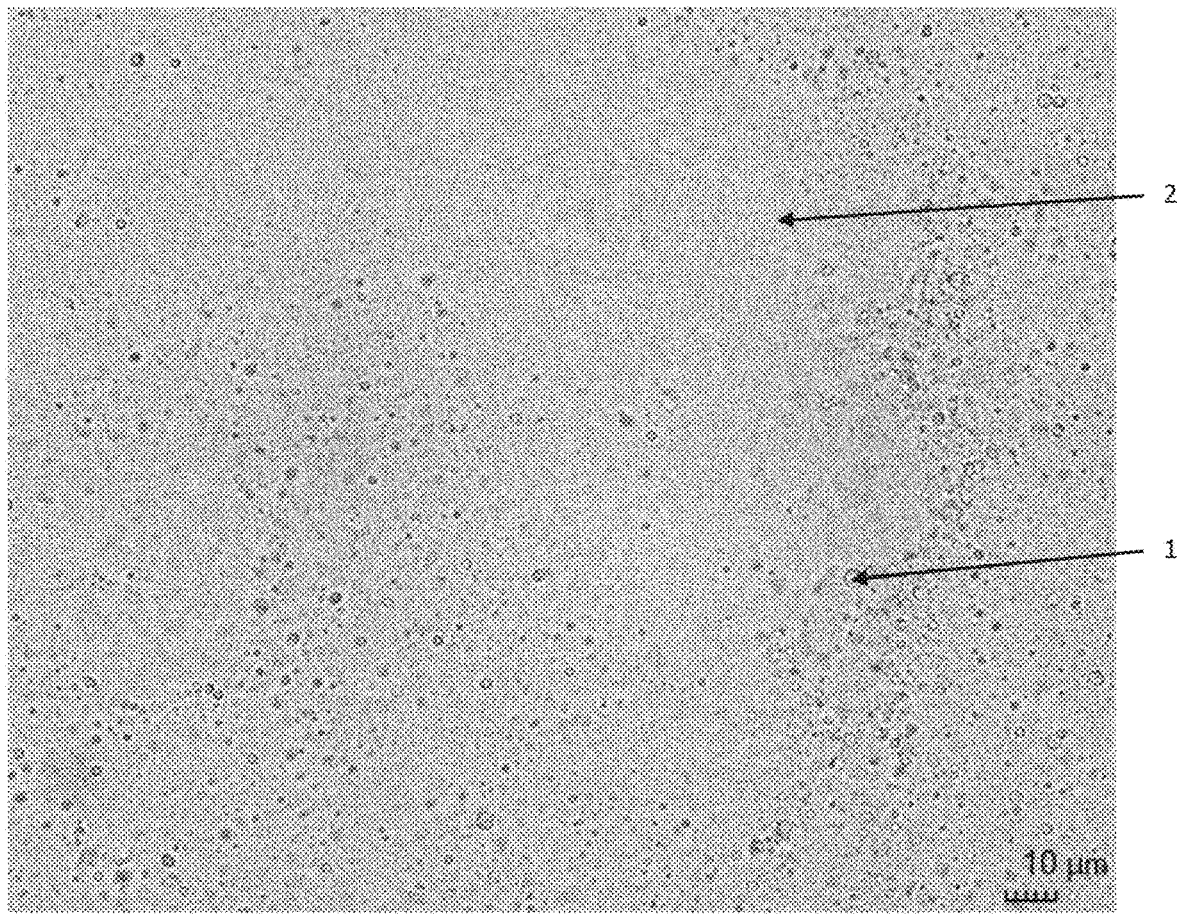

[Fig. 3]
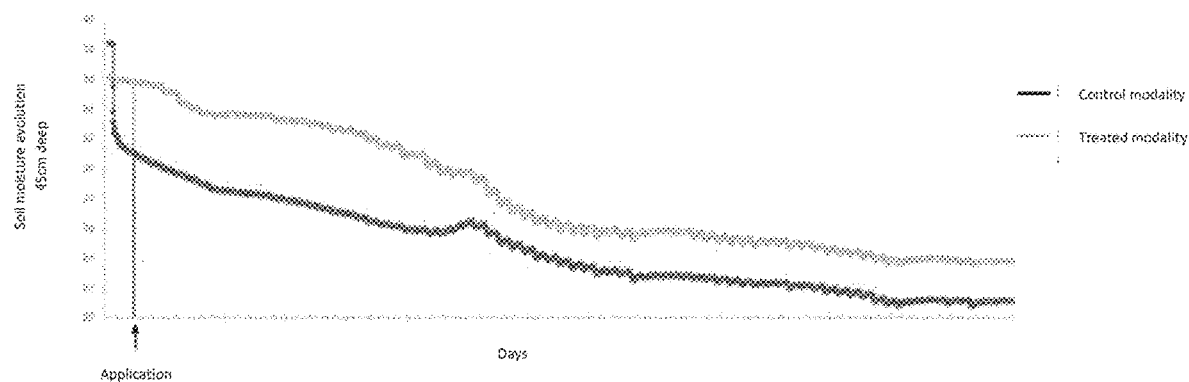
[Fig. 4]
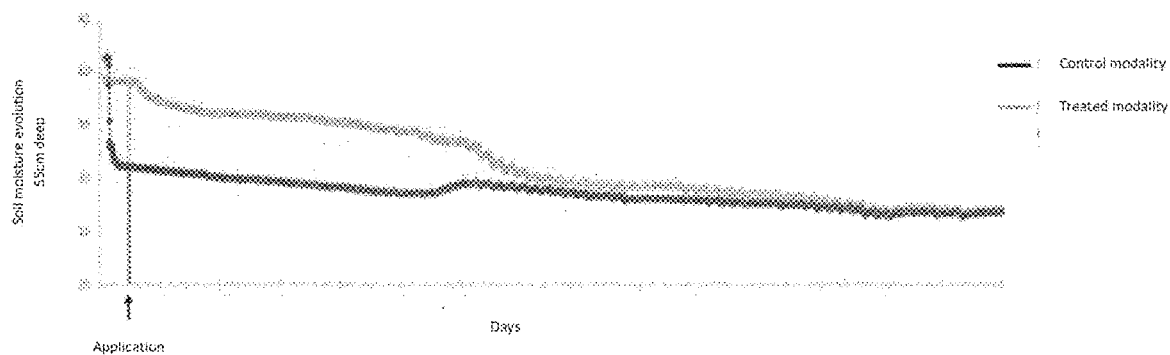

[Fig. 5]
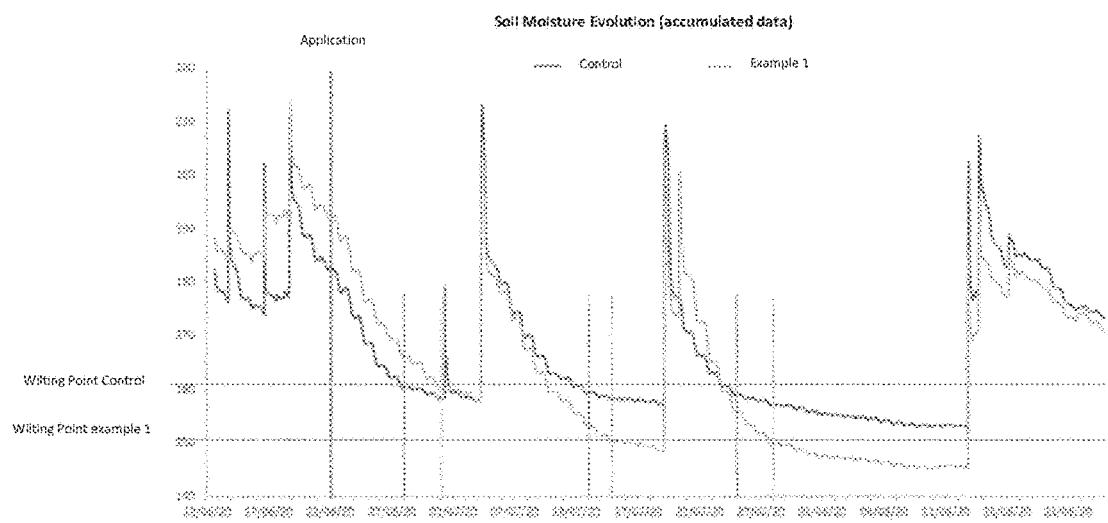
[Fig. 6]
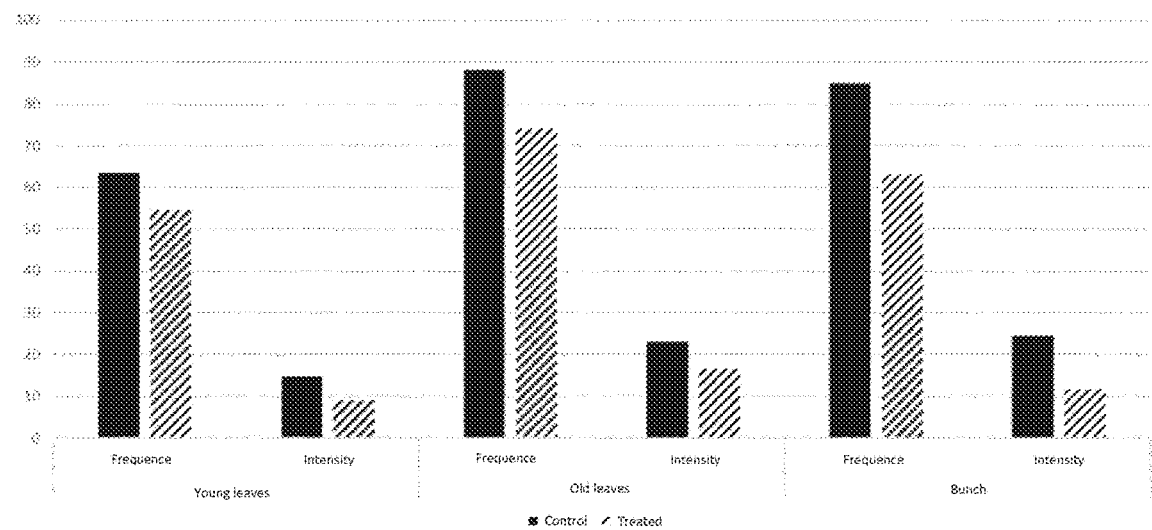

[Fig. 7]
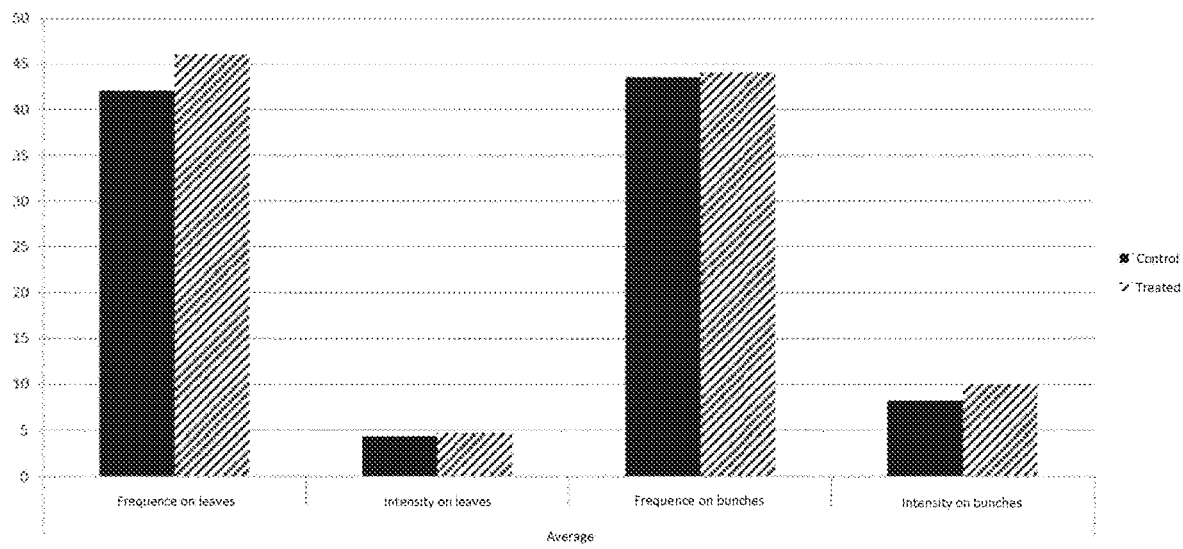

PHYTOSTEROL-BASED AGRICULTURAL COMPOSITION AND THEIR USE

FIELD OF THE INVENTION

The invention relates to agriculture and, in particular, to cultivated plants, notably field-grown plants, and to the prevention of adverse effects linked to exposure to abiotic and/or biotic stresses in said cultivated plants, including the loss of dry matter. Hence, the invention involves a phytosterol-based composition, its method of manufacture, a slurry comprising the said diluted composition, and its uses, particularly in a preventive treatment process targeting the onset of deleterious effects induced by exposure to an abiotic and/or biotic stress.

STATE OF THE ART

Plants, i.e., crop plants and especially ornamental plants, are subjected to various forms of stress. In particular, plants are constantly exposed to their environment and cannot escape abiotic stress factors (drought, cold, frost, salinity, etc.). At the same time, they are also exposed to biotic stress factors, i.e., stresses resulting from the harmful action of a living or bioaggressive organism (viruses, fungi, bacteria, insects, pests, etc.) and more generally of a plant pathogen.

For the purpose of the invention, "abiotic stress" refers to a non-living stimulus on living vegetal organisms, for instance a climate hazard on a crop.

For the purpose of the invention, "plant pathogen" refers to a pathogen capable of infecting and/or invading a plant part and causing disease therein.

In general, these abiotic and biotic stresses cause morphological, physiological, biochemical and molecular changes in plants, resulting in a decrease in the per-hectare crop yield, i.e., a decrease in the production or the quality of dry matter.

In other words, a cultivated plant, for example a field-grown plant, is subjected to these various forms of stress, which, among other effects, will provoke a decrease in the production of dry matter by the plant compared to a plant cultivated under optimal conditions (controlled conditions with regard to water supply, daylight/nighttime period, absence of exposure to abiotic and/or biotic stresses, etc.).

To combat abiotic stress, especially water stress (or drought), farmers have adapted by simplifying their crop rotations and giving precedence to winter crops. The first consequence of this simplification is not only an increased risk that plants growing wild (weeds) and pests will develop resistance to phytopharmaceutical products, but also an increased risk of water pollution due to large applications of products at the same time of the year. The second consequence is the disproportionate cultivation of starch-producing plants (notably straw cereals) compared to protein-producing plants (legumes). In addition, to combat drought, farmers resort to extensive crop irrigation, which leads to environmental and economic problems.

Concerning the fight against biotic stresses, farmers use chemical or biocontrol products that rely on natural mechanisms. The use of chemicals in agriculture is controversial, however, given their potential toxicity for human health and for the environment. It is therefore necessary to minimize, as much as possible, the amount of these products that is used, while optimizing their effects.

To combat these different types of stress, curative treatments have been proposed that consist in applying to the plants a mixture of surfactants, such as sucrose stearate and β-sitosterol, following exposure to a biotic or abiotic stress. This is the case, for example, of document WO2019/030442 A1 of the Applicant, which describes the application of a composition containing 80% sucrose stearate by weight and 20% β-sitosterol by weight, diluted to 3% in water.

Similarly, document WO 2018/229710 describes a composition for stimulating plant growth, where applicable in the presence of a stress factor, this composition being in the form of a concentrated suspension comprising a mixture of phytosterols in an amount greater than 25% of the suspension by weight. The objective is to increase the concentration of phytosterols to allow application in smaller quantities. In practice, the amount of composition applied is 400 g/ha. The composition furthermore contains a wetting agent and/or a surfactant, present in respective amounts of between 1% and 5%. The suspension is obtained by grinding the different constituents until the particle size becomes smaller than 10 μm. This document shows that the composition exhibits better biostimulant effects compared to the same unground composition. One of the drawbacks of this composition resides in its cost, which is linked to the large amount of phytosterols it contains, the price of phytosterols being particularly high.

The problem that the invention purports to solve is therefore that of developing an alternative phytosterol-based composition that can be applied in the lowest possible quantities while exhibiting high effectiveness with regard to abiotic and biotic stresses, resulting in only a small loss of dry matter.

DISCLOSURE OF THE INVENTION

The Applicant has thus perfected the surfactant- and phytosterol-based compositions described in documents WO2019/030442 A1 and WO 2018/229710 by proposing no longer a solution or a suspension but rather an oil-in-water emulsion, which aqueous phase contains a surfactant that is in particulate form, with this composition also being referred to below as a multiphase composition.

The Applicant has thus ascertained that, most surprisingly, the composition of the invention has made it possible to drastically reduce the amount of phytosterols applied, thereby reducing the cost of the treatment.

It was also observed that the composition of the invention, when applied to the crop plant as a preventive care, i.e., prior to the onset of a stress, enabled a further reduction in the harmful effects of abiotic and/or biotic stresses, notably the loss of dry matter and the resulting decrease in per-hectare yields.

The Applicant has made the assumption that the surfactant present in the aqueous phase plays a particular role in the wetting properties of the composition and in the penetration of the composition through the cuticle, notably through a solubilization of the epicuticular waxes (the waxes situated on the outermost part of the surface of the cuticle) and of some or all of the waxes present on the inside of the cutin layer, thereby creating access pathways for aqueous-based materials.

The epicuticular waxes appear to form "crystals" on the surface of the leaf that would account for the creation of angles preventing the drops from spreading appropriately.

Thus, the particulate surfactant would therefore allow the solubilization of these waxes and would reduce, even eliminate, the presence of these angles. At the same time, the surfactant present in the aqueous phase would ensure a loosening of the bonds between the constituent molecules of the cutin, thereby facilitating the penetration of the droplets containing the mixture of phytosterols into the cellular membrane of the plant.

As a consequence, it is possible to reduce the quantity of phytosterols contained in the composition by improving its diffusion into the cellular membrane of the plant in order to obtain beneficial effects for the plant that are at least similar to, and usually better than, those provided by the compositions of the prior art.

The first surfactant, i.e., the one present at the interface of the oil droplets and of the aqueous phase, plays a conventional role in stabilizing the emulsion.

Consequently, and according to a first aspect, the invention relates to a multiphase agricultural composition in the form of a suspo-emulsion, comprising lipophilic droplets containing a mixture of phytosterols, said lipophilic droplets being dispersed in an aqueous phase, the composition further comprising:

- at least one first surfactant (SF1) located at the interface of the lipophilic droplets and of the aqueous phase and selected from among the SFs that are soluble in the aqueous phase (WATER SF1) and the SFs that are soluble in the lipophilic droplets (OIL SF1); and
- at least one second surfactant (SF2) suspended in the aqueous phase, said second surfactant having the form of particles insoluble in the aqueous phase.

In the description, lipophilic droplets are also named oil droplets.

The composition is deemed to be "multiphase" in that it comprises two distinct oil and water phases, but it cannot be described as a suspension or as an emulsion, given that the aqueous phase also contains a third phase made of solid particles. It could therefore be described as a suspo-emulsion.

According to a first characteristic of the composition, at least one first surfactant (SF1) is located at the interface of the lipophilic droplets and of the aqueous phase and selected from among the SFs that are soluble in the aqueous phase (WATER SF1) and the SFs that are soluble in the lipophilic droplets (OIL SF1). Generally, WATER SF1 and OIL SF1 differ from each other by the proportion of their hydrophobic and hydrophilic parts. Practically, the hydrophilic/hydrophobic balance of WATER SF1 is higher than the one of OIL SF1. In contrast, the hydrophobic/hydrophilic balance of OIL SF1 is higher than the one of WATER SF1. In specific embodiments, WATER SF1 and OIL SF1 are identical.

According to the second characteristic of the composition, at least one second surfactant (SF2) is suspended in the aqueous phase, said second surfactant having the form of particles insoluble in the aqueous phase.

In the context of the invention, the expression "insoluble in the aqueous phase" refers to a compound which presents the inability to form with water a homogenous solution at the microscopic or the macroscopic level, at a given temperature and atmospheric pressure.

By contrast, the word "solubility" refers to a compound which leads to a homogenous solution without remaining insoluble particles when it is added to a liquid, at a given temperature and atmospheric pressure.

Advantageously, the first surfactant (WATER SF1) is soluble in water heated at 80° C. at a concentration of at least 2 g/L.

Advantageously, the first surfactant (OIL SF1) is soluble in the oil phase heated at 110° C. at a concentration of at least 2 g/L.

Advantageously, the limit of solubility in the water of the second surfactant (SF2) observed practically at 25° C. is less than 10 mg/L, preferably less than 5 mg/L, more preferably, less than 2 mg/L.

The Applicant has noted that the phytosterols composition formulated this manner and applied to the crop plant in an effective amount as a preventive measure, i.e., prior to the onset of the stress, enabled a reduction in the harmful effects of abiotic and/or biotic stresses, notably the loss of dry matter and the resulting decrease in per-hectare yields.

An "effective amount", as used herein, is an amount sufficient to affect beneficial or desired results.

In particular, the composition of the invention presents the advantages of improving plant growth and of reducing the number of days during which the cultivated plant is below the wilting point. The plant is thus more able to combat the deleterious effects of exposure to abiotic and/or biotic stress.

In other words, the application of the composition of the invention to a cultivated plant prior to the onset of an abiotic and/or biotic stress, increases the time spent in the easily usable soil water reserve (EUSWR) and reduces the time spent below the wilting point, i.e., the time spent in the soil survival reserve (SSR). The result is improved dry matter production and/or yield.

For the purposes of the invention, the term "easily usable soil water reserve" (or EUSWR) refers to the proportion of the usable soil water reserve (USWR) that a cultivated plant can extract without reducing its transpiration (or evapotranspiration), experiencing water stress or limiting its growth. The EUSWR generally represents 40% to 80% of the USWR depending on the depth of the soil and the species of plants cultivated.

For the purposes of the invention, the term "soil survival reserve" (or SSR) refers to the proportion of the USWR that a cultivated plant cannot extract. The plant is consequently in a state of water stress, because its transpiration (or evapotranspiration) is not reduced. Therefore, the cultivated plant limits its growth or even wilts.

For the purposes of the invention, the term "wilting point" (or WP) refers to the soil water status below which the plant can no longer draw the water necessary for its growth, i.e., the point below which the tension between the roots and the plant is high and the roots can no longer extract water from the soil. It is therefore the threshold below which the cultivated plant has entirely consumed the EUSWR and will wilt, albeit reversibly, but with an impact on the yield. This parameter is determined in particular through the measurement of soil humidity, for example by means of a neutron probe, a tensiometer or a time-domain reflectometry (TDR) moisture meter. The wilting point depends on the field capacity, on the amount of water available to the plant according to the various soil types and on the variety of plant cultivated.

For the purposes of the invention, the term "yield" refers to the amount of product harvested, whether seeds or fruits, dry matter or green matter, or wine, over a given cultivation area.

For the purposes of the invention, the term "cultivated plant," in contrast to a naturally existing plant, refers to all plants that can be cultivated, i.e., sown, planted and exploited, by man.

By "plants" is meant all plants and plant populations such as desirable and undesirable wild plants, cultivars and plant varieties (whether or not protectable by plant variety or plant breeder's rights). Cultivars and plant varieties can be plants obtained by conventional propagation and breeding methods which can be assisted or supplemented by one or more biotechnological methods such as by use of double haploids, protoplast fusion, random and directed mutagenesis, molecular or genetic markers or by bioengineering and genetic engineering methods.

The term "plant" includes whole plants and parts thereof, including, but not limited to, shoot vegetative organs/structures (e.g. leaves, stems and tubers), roots, flowers and floral organs/structures (e.g. bracts, sepals, petals, stamens, carpels, anthers and ovules), seeds (including embryo, endosperm, and seed coat) and fruits (the mature ovary), plant tissues (e.g. vascular tissue, ground tissue, and the like) and cells (e.g. guard cells, egg cells, and the like), and progeny of same. "Fruit" and "plant produce" are to be understood as any plant product which is further utilized after harvesting, e.g. fruits in the proper sense, nuts, wood etc., that is anything of economic value that is produced by the plant.

As another characteristic, the majority of the lipophilic droplets present in the composition before addition of SF2, advantageously at least 90% of the lipophilic droplets (also named Dv90 emulsion) has a diameter comprised between 0.01 and 70 μm, preferably between 0.1 and 50 μm, most preferably between 0.1 and 20 μm with a peak maximum preferably of less than 10 μm, advantageously between 0.5 to 7 μm, preferably between 2 and 6 μm as determined by laser diffraction.

An essential feature of the invention is that the composition contains at least two surfactants, referred to as SF1 and SF2.

The composition therefore contains a first surfactant (SF1) located at the interface of the oil droplets and of the aqueous phase. This first SF is selected from among the SFs that are soluble in the aqueous phase (WATER SF1) and the SFs that are soluble in the oil droplets (OIL SF1). Therefore, at the interface of the oil droplets and of the aqueous phase, the composition can contain:
at least one WATER SF1, or
at least one OIL SF1, or
at least one WATER SF1 and at least one OIL SF1.

The composition also contains a second surfactant (SF2). The second surfactant (SF2) is in the form of particles.

Advantageously at least 90% of the particles of the composition of the invention (also named Dv90 suspoemulsion) has a diameter comprised between 1 and 1000 μm, advantageously between 10 and 250 μm with a peak maximum preferably of between 10 μm and 100 μm as determined by laser diffraction.

In other words, the composition can contain:
at least one WATER SF1 and at least one SF2, or
at least one OIL SF1 and at least one SF2, or
at least one WATER SF1, at least one OIL SF1 and at least one SF2.

To facilitate the method of manufacture of the composition, the composition contains at least two SFs, and respectively at least one OIL SF1 and/or WATER SF1 and at least one SF2, with OIL SF1 or WATER SF1 and SF2 being identical.

As for example, fatty acid sugar esters may be used as both WATER SF1 and OIL SF1 since they are soluble in oil and in water at different temperatures.

In practice, WATER SF1, OIL SF1 and SF2 are selected according to the desired solubility in lipophilic droplets or in water, from among the group comprising:
anionic surfactants, advantageously anionic surfactants whose polar head group is a carboxylate, a sulfonate or a sulfated alcohol;
cationic surfactants, advantageously cationic surfactants whose polar head group is an amine, a quaternary amine or a quaternary ammonium ester;
amphoteric surfactants, advantageously betaine derivatives or phospholipids;
neutral surfactants, advantageously ethoxylates, alkanolamines, alkylglucamides, polyol esters, alkyl monoglucosides or alkyl polyglucosides, polyol ethers, polyoxyethylene sorbitan esters (especially Tween 20, Tween 21, Tween 22, Tween 23, Tween 24, Tween 28, Tween 40, Tween 60, Tween 61, Tween 65, Tween 80), or sorbitan esters (especially Span 20, Span 40, Span 60, Span 65, Span 80, Span 83, Span 85, Span 120);
natural surfactants, advantageously lecithins, preferably soy lecithin, or surfactants derived from amino acids; and —surfactants synthesized from natural raw materials, advantageously polyol derivatives, preferably fatty acid sugar esters; the preferred fatty acid sugar esters are saccharose stearate, saccharose palmitate and their polyesters, or mixtures thereof.

In the rest of the description and claims the terms "sucrose stearate" and "saccharose stearate" are used indifferently. As well, "sucrose palmitate" and "saccharose palmitate" are used indifferently.

In the description and in the claims, the expression "saccharose stearate" designates pure saccharose stearate or a mixture of saccharose esters of fatty acids containing mostly saccharose stearate. Example of pure saccharose stearate corresponds to CAS number [136152-91-5]. Example of a mixture of saccharose ester of fatty acids containing mostly saccharose stearate corresponds for example to CAS number [25168-73-4] or [84066-95-5].

In the description and in the claims, the expression "saccharose palmitate" designates pure saccharose palmitate or a mixture of saccharose esters of fatty acids containing mostly saccharose palmitate. Example of pure saccharose palmitate corresponds to CAS number [110539-62-3]. Example of a mixture of saccharose ester of fatty acids containing mostly saccharose palmitate corresponds to CAS number [26446-38-8].

Preferably, the composition contains at least one OIL SF1 or WATER SF1 and at least one SF2, with both of them being selected from among the group comprising the fatty acid sugar esters.

In practice, these esters are solids at ambient temperature. Being naturally lipophilic compounds, they are insoluble in the aqueous phase and are therefore candidates for the role of SF2. They are also soluble in the oil droplets, but only on the condition that they undergo prior heating to their melting temperature, which can easily be determined by a person skilled in the art. For this reason, they are also candidates for the role of OIL SF1. This explains why OIL SF1 and SF2 may be the same.

Fatty acid sugar esters may also be used as both WATER SF1 and OIL SF1. Indeed, sucrose esters are generally soluble in water at high temperature. It concerns for example sucrose stearate which is soluble in water at around 80° C.

Advantageously, the fatty acid sugar esters are saccharose stearate, saccharose palmitate and their polyesters, or mixtures thereof.

According to a specific embodiment, the first surfactant, in this case OIL SF1 or WATER SF1, and/or the second surfactant SF2 contain sucrose stearate or, advantageously, a mixture containing saccharose stearate and sucrose palmitate.

According to a specific embodiment, the first surfactant (OIL SF1) and/or (WATER SF1) and/or the second surfactant (SF2) is a mixture containing:
- between 20% and 80% by weight, advantageously 70% saccharose stearate with a monoester content ranging between 20% and 80% by weight of saccharose stearate, advantageously 70%, with the balance being a mixture of di-, tri- and/or polyesters; and
- between 20% and 80% by weight, advantageously 30% saccharose palmitate with a monoester content ranging between 20% and 80% by weight of saccharose palmitate, advantageously 70%, with the balance being a mixture of di-, tri- and/or polyesters.

According to a specific embodiment, the first surfactant OIL SF1 and/or WATER SF1 and/or the second surfactant SF2 is sucrose stearate (preferably CAS number [25168-73-4] or [84066-95-5]). Preferably, the composition contains one first surfactant OIL SF1 or WATER SF1 and one second surfactant SF2 where OIL SF1 or WATER SF1 and SF2 are sucrose stearate.

According to another specific embodiment, the first surfactant OIL SF1 and/or the second surfactant SF2 is sucrose palmitate, preferably CAS [26446-38-8].

According to another specific embodiment, the first surfactant OIL SF1 is sucrose stearate (preferably CAS number [84066-95-5] or [25168-73-4]) and the second surfactant SF2 is sucrose palmitate, preferably CAS number [26446-38-8] or the first surfactant OIL SF1 is sucrose palmitate and the second surfactant SF2 is sucrose stearate.

According to another specific embodiment, the first surfactant OIL SF1 is sucrose stearate (preferably CAS number [84066-95-5] or [25168-73-4]) or sucrose palmitate, preferably CAS number [26446-38-8] and the second surfactant SF2 is soy lecithin CAS [8002-43-5].

According to a specific embodiment, the first surfactant (SF1) represents between 0.2% and 10% of the composition by weight, and the second surfactant (SF2) represents between 0.01% and 5% of the composition by weight.

Advantageously, the first surfactant (OIL SF1) is identical to the second surfactant (SF2). In this case, the first surfactant preferably represents between 3% and 7% of the composition by weight, and the second surfactant preferably represents between 0.1% and 2.5% of the composition by weight and is advantageously sucrose stearate (preferably CAS number [25168-73-4] or [84066-95-5]).

As mentioned above, in a specific embodiment, the composition contains at least one WATER SF1, at least one OIL SF1 and at least one SF2.

Advantageously, the WATER SF1 is selected from the group of polyoxyethylene sorbitan esters, the OIL SF1 is selected from the group of sorbitan esters and SF2 is selected from the group of natural surfactants.

In a preferred embodiment, the WATER SF1 is polyethylene glycol sorbitan monooleate (Tween 80), the OIL SF1 is sorbitan monolaurate (Span 20) and SF2 is soy lecithin (CAS [8002-43-5]).

In another embodiment, the WATER SF1 is selected from the group of polyoxyethylene sorbitan esters, the OIL SF1 is selected from the group of sorbitan esters and SF2 is selected from the group comprising fatty acid sugar esters.

In another preferred embodiment, the WATER SF1 is Tween 20, the OIL SF1 is Span 85 and SF2 is sucrose stearate (preferably CAS number [25168-73-4] or [84066-95-5]). In another preferred embodiment, the WATER SF1 is Tween 80, the OIL SF1 is Span 20 and SF2 is sucrose stearate (preferably CAS number [25168-73-4] or [84066-95-5]).

According to a specific embodiment, the phytosterols mixture of the invention contains free phytosterols and/or conjugated phytosterols, with the conjugated phytosterols being advantageously selected from among the group comprising phytosterol esters, phytosterol glycosides, acylated phytosterol glycosides and mixtures thereof.

Examples of free phytosterols in the context of the invention include β-sitosterol, campesterol, stigmasterol, cholesterol and brassicasterol, and mixtures thereof.

One example of a phytosterol ester in the context of the invention is that of esterified β-sitosterol.

Examples of phytosterol glycosides in the context of the invention include β-sitosterol-β-D-glucoside and glucosyl stigmasterol.

Examples of acylated phytosterol glycosides in the context of the invention include 16:0 sitosteryl glucose, 18:1 sitosteryl glucose, 16:0 stigmasteryl glucose, and 18:1 stigmasteryl glucose.

According to a specific embodiment, the mixture of phytosterols also contains at least one precursor of the phytosterols biosynthetic pathway or at least one of its derivatives. This can be, for example, a molecule selected from among the group comprising squalene, squalane, mevalonate and cycloartenol.

According to a specific embodiment, the phytosterols mixture in the context of the invention contains β-sitosterol.

Advantageously, the phytosterols mixture contains β-sitosterol, representing at least 30% of the phytosterols mixture by weight, preferably at least 35%, with the balance to 100% containing in particular, and where appropriate, campesterol, stigmasterol and brassicasterol.

As an example, a phytosterols mixture of the invention can be an extract of phytosterols obtained from oleaginous seeds such as soybeans, pine seeds, sunflower seeds or rapeseeds. One possible example of said phytosterols mixture is the raw material with CAS number [949109-75-5]. Phytosterols mixture of the invention can also be an extract of phytosterols obtained from pine's wood after conversion into wood pulp.

According to a specific embodiment, the phytosterols mixture represents between 0.2% and 10% of the composition by weight, advantageously between 0.5% and 7%, and preferably between 1% and 5%.

According to a specific embodiment, the composition of the invention contains:
- a mixture comprising β-sitosterol, representing advantageously at least 30% of the mixture by weight, along with campesterol, stigmasterol and brassicasterol; and
- a first surfactant (OIL SF1) and/or a second surfactant (SF2) comprising saccharose stearate, advantageously a mixture containing saccharose stearate and saccharose palmitate.

According to another specific embodiment, the composition of the invention contains:
- a mixture of phytosterols corresponding to CAS number [949109-75-5] and
- a first surfactant (OIL SF1) that is identical to a second surfactant (SF2) which is sucrose stearate, as example CAS number [84066-95-5 or 25168-73-4].

According to a specific embodiment, the weight ratio of the mixture of phytosterols to the first surfactant (SF1) and second surfactant (SF2) is between 0.01 and 15, and advantageously between 0.1 and 5.

According to a specific embodiment, the composition of the invention also contains at least one component selected from among the group including:

at least one fluidifying agent selected from among the group comprising glycerin, ethanol, propylene glycol, polyethylene glycol with an average molecular weight between 100, preferably between 200 and 8000 Da, advantageously between 200 and 1000 Da, preferably equal to 200 Da and more preferably equal to 400 Da; with the fluidifying agent advantageously representing between 1% and 15% of the composition by weight, and advantageously between 2% and 8%; and/or at least one solubilizing agent for phytosterols (or fatty substances) selected from among the group comprising lecithins, fatty alcohols as for example oleyl alcohol; fatty acids as for example oleic acid, linoleic acid; glycerides, triglycerides, plant oils, advantageously soybean oil, grapeseed oil, sea buckthorn oil, corn oil, rapeseed oil or sunflower oil; with the solubilizing agent advantageously representing between 1% and 30% of the composition by weight, and advantageously between 4% and 15%; and/or at least one wetting agent selected from among the group comprising silanes, siloxanes, triglycerides, a mixture of fatty acids, a mixture of fatty acid methyl esters, advantageously including methyl tetradecanoate, methyl hexadecanoate and methyl octadecanoate, or a mixture thereof with the wetting agent advantageously representing between 0.1% and 5% of the composition by weight; and/or at least one chelating agent, selected from among the group comprising natural chelating agents, advantageously sodium phytate or amino acid-based chelating agents; and synthetic chelating agents, advantageously 2,2'-bipyridine, dimercaptopropanol, ethylene glycol-bis(2-aminoethyl)-N,N,N,N'-tetraacetic acid (EGTA), ethylenediaminetetraacetic acid (EDTA), nitrilotriacetic acid, iminodiacetic acid, salicylic acid or triethanolamine, and preferably EDTA; with the chelating agent advantageously representing between 0.01% and 5% of the composition by weight; and/or at least one preservative, advantageously selected from among the group comprising benzyl alcohol, benzoic acid and its salts, especially sodium benzoate, dehydroacetic acid and its salts, especially sodium dehydroacetate, salicylic acid and its salts, sorbic acid and its salts, especially potassium sorbate, 2-phenylethanol, phenoxyethanol, phenylpropanol, and preferably benzyl alcohol; with the preservative advantageously representing between 0.01% and 5% of the composition by weight.

Of course, all the above components can have more properties that the ones cited above.

According to another embodiment, the composition of the invention also contains an antioxidant agent selected from the group comprising citric acid and its salts, tartric acid and its salts, sodium lactate, potassium lactate, calcium lactate, lecithins, tocopherols, polyphenols, butylhydroxyanisole, butylhydroxytoluol, octyl gallate, dodecyl gallate, lycopen.

According to a specific embodiment, the composition of the invention advantageously comprises:

0.2% to 30% of the composition by weight of at least the first and second surfactant, which are preferably identical, advantageously saccharose stearate and even more advantageously saccharose stearate having CAS number [84066-95-5] or [25168-73-4];

0.2% to 10% of the composition by weight of a mixture of phytosterols containing β-sitosterol, with the β-sitosterol advantageously representing at least 30% of the mixture by weight, and the balance comprising a mixture of campesterol, stigmasterol and brassicasterol, with the overall mixture corresponding even more advantageously to CAS number [949109-75-5];

1% to 15% of the composition by weight of a fluidifying agent, advantageously polyethylene glycol with a number average molecular weight (Mn) between 200 and 8000 Da, advantageously between 200 and 1000 Da, and preferably equal to 400 Da; or a plant oil as mentioned previously;

0.1% to 5% of the composition by weight of a wetting agent, advantageously fatty acid methyl esters, preferably comprising methyl tetradecanoate, methyl octadecanoate and methylhexadecanoate or a mixture thereof;

0.01% to 5% of the composition by weight of a preservative, advantageously benzyl alcohol;

0.01% to 5% of the composition by weight of a natural or synthetic chelating agent, advantageously as described previously, and preferably EDTA; and the balance being water (water QSP 100%).

According to another aspect, the invention relates to a slurry resulting from the dilution of the composition as previously described.

For the purposes of the invention, the term "slurry" therefore refers to the composition of the invention diluted in water or in a solution containing water and one or more active ingredients. The product which is applied on the plant in the fields is the slurry.

Advantageously, the viscosity of the slurry of the invention is less than or equal to 200 cP, advantageously equal to or strictly higher than 1 cP, and less than or equal to 100 cP. In the context of the invention, the viscosity is measured using an Anton Paar QC300 viscometer, and the measurement is made at ambient temperature with the DG26 measurement system.

Advantageously, the pH of the slurry of the invention is between 5 and 8, preferably between and 7, and is even more advantageously between 6 and 7.

In the context of the invention, the Applicant hypothesizes that diluting the composition as a slurry enables the solubilization of the solid component of the second surfactant that is still in suspension in the aqueous phase, or an increase in the quantity of the second surfactant that is present in solubilized form, thereby ensuring a more effective slurry, and therefore a more effective composition of the invention.

According to a specific embodiment, the mixture of phytosterols and the surfactant(s) of the invention are combined with at least one active ingredient.

For the purposes of the invention, the term "active ingredient" refers to a product that allows the plant to combat preferably abiotic and/or biotic stresses, advantageously selected from the group comprising:

a phytopharmaceutical product such as a plant growth regulator, a fungicide, a fungistatic agent, a bactericide, a bacteriostatic agent, an insecticide, an acaricide, a parasiticide, a nematicide, a talpicide or an herbicide;

a biocontrol product based on natural mechanisms that enables plants to combat fungal infections, bacterial infections, viral infections, pest attacks and/or competition with weeds; and/or a nutrient, organic or inorganic such as a micronutrient or a fertilizer.

The term "bactericide", as used herein, refers to the ability of a substance to increase mortality or inhibit the growth rate of bacteria.

The term "insecticide" as well as the term "insecticidal" refers to the ability of a substance to increase mortality or inhibit growth rate of insects. As used herein, the term "insects" comprises all organisms in the class "Insecta".

The term "nematicide" and "nematicidal" refers to the ability of a substance to increase mortality or inhibit the growth rate of nematodes. In general, the term "nematode" comprises eggs, larvae, juvenile and mature forms of said organism.

The term "acaricide" and "acaricidal" refers to the ability of a substance to increase mortality or inhibit growth rate of ectoparasites belonging to the class Arachnida, sub-class Acari.

Plant growth regulator may be selected from the group consisting of:
- Antiauxins: clofibric acid, 2,3,5-tri-iodobenzoic acid;
- Auxins: 4-CPA, 2,4-D, 2,4-DB, 2,4-DEP, dichlorprop, fenoprop, IAA (indole-3-acetic acid), IBA, naphthaleneacetamide, α-naphthaleneacetic acid, 1-naphthol, naphthoxyacetic acid, potassium naphthenate, sodium naphthenate, 2,4,5-T;
- Cytokinins: 2iP, 6-benzylaminopurine (6-BA), 2,6-dimethylpyridine, kinetin, zeatin;
- Defoliants: calcium cyanamide, dimethipin, endothal, merphos, metoxuron, pentachlorophenol, thidiazuron, tribufos, tributyl phosphorotrithioate;
- Ethylene modulators: aviglycine, 1-methylcyclopropene (1-MCP), prohexadione (prohexadione calcium), trinexapac (trinexapac-ethyl);
- Ethylene releasers: ACC, etacelasil, ethephon, glyoxime;
- Gibberellins: gibberelline, gibberellic acid;
- Growth inhibitors: abscisic acid, ancymidol, butralin, carbaryl, chlorphonium, chlorpropham, dikegulac, flumetralin, fluoridamid, fosamine, glyphosine, isopyrimol, jasmonic acid, maleic hydrazide, mepiquat (mepiquat chloride, mepiquat pentaborate), piproctanyl, prohydrojasmon, propham, 2,3,5-tri-iodobenzoic acid;
- Morphactins: chlorfluren, chlorflurenol, dichlorflurenol, flurenol;
- Growth retardants: chlormequat (chlormequat chloride), daminozide, flurprimidol, mefluidide, paclobutrazol, tetcyclacis, uniconazole, metconazole;
- Growth stimulators: brassinolide, forchlorfenuron, hymexazol;
- Unclassified plant growth regulators/classification unknown: amidochlor, benzofluor, buminafos, carvone, choline chloride, ciobutide, clofencet, cloxyfonac, cyanamide, cyclanilide, cycloheximide, cyprosulfamide, epocholeone, ethychlozate, ethylene, fenridazon, fluprimidol, fluthiacet, heptopargil, holosulf, inabenfide, karetazan, lead arsenate, methasulfocarb, pydanon, sintofen, triapenthenol Fungicides and fungistatics may be selected among the group:
- Respiration inhibitors
  - Inhibitors of complex III at Qo site like for example azoxystrobin, coumethoxystrobin, coumoxystrobin, dimoxystrobin, enestroburin, fenaminstrobin, fenoxystrobin/flufenoxystrobin, fluoxastrobin, kresoxim-methyl, metominostrobin, orysastrobin, picoxystrobin, pyraclostrobin, pyrametostrobin, pyraoxystrobin, trifloxystrobin, pyribencarb, triclopyricarb/chlorodincarb, famoxadone, fenamidone;
  - inhibitors of complex III at Qi site: cyazofamid, amisulbrom,
  - inhibitors of complex II: flutolanil, benodanil, bixafen, boscalid, carboxin, fenfuram, fluopyram, flutolanil, fluxapyroxad, furametpyr, isopyrazam, mepronil, oxycarboxin, penflufen, penthiopyrad, sedaxane, tecloftalam, thifluzamide,
  - other respiration inhibitors (e.g. complex I, uncouplers): diflumetorim;
  - nitrophenyl derivates: binapacryl, dinobuton, dinocap, fluazinam; ferimzone; organometal compounds: fentin-acetate, fentin chloride or fentin hydroxide; ametoctradin; and silthiofam;
- Sterol biosynthesis inhibitors (SBI fungicides)
  - C14 demethylase inhibitors (DMI fungicides): triazoles: azaconazole, bitertanol, bromuconazole, cyproconazole, difenoconazole, diniconazole, diniconazole-M, epoxiconazole, fenbuconazole, fluquinconazole, flusilazole, flutriafol, hexaconazole, imibenconazole, ipconazole, metconazole, myclobutanil, oxpoconazole, paclobutrazole, penconazole, propiconazole, prothioconazole, simeconazole, tebuconazole, tetraconazole, triadimefon, triadimenol, triticonazole, uniconazole,
  - imidazoles: imazalil, pefurazoate, prochloraz, triflumizol; pyrimidines, pyridines and piperazines: fenarimol, nuarimol, pyrifenox, triforine; Delta14-reductase inhibitors: aldimorph, dodemorph, dodemorph-acetate, fenpropimorph, tridemorph, fenpropidin, piperalin, spiroxamine; Inhibitors of 3-keto reductase: fenhexamid;
- Nucleic acid synthesis inhibitors:
  - Phenylamides or acyl amino acid fungicides: benalaxyl, benalaxyl-M, kiral-axyl, metalaxyl, ofurace, oxadixyl; others: hymexazole, octhilinone, oxolinic acid, bupirimate, 5-fluorocytosine,
- Inhibitors of cell division and cytoskeleton
  - tubulin inhibitors: benzimidazoles, thiophanates: benomyl, carbendazim, fuberidazole, thiabendazole, thiophanate-methyl; triazolopyrimidines,
  - cell division inhibitors: diethofencarb, ethaboxam, pencycuron, fluopicolide, zoxamide, metrafenone, pyriofenone;
- Inhibitors of amino acid and protein synthesis
  - methionine synthesis inhibitors (anilino-pyrimidines): cyprodinil, mepanipyrim, pyrimethanil; protein synthesis inhibitors: blasticidin-S, kasugamycin, kasugamycin hydrochloride-hydrate, mildiomycin, streptomycin, oxytetracyclin, polyoxine, validamycin A;
- Signal transduction inhibitors
  - MAP/histidine kinase inhibitors: fluoroimid, iprodione, procymidone, vinclozolin, fenpiclonil, fludioxonil;
  - G protein inhibitors: quinoxyfen;
- Lipid and membrane synthesis inhibitors
  - Phospholipid biosynthesis inhibitors: edifenphos, iprobenfos, pyrazophos, isoprothiolane; lipid peroxidation: dicloran, quintozene, tecnazene, tolclofos-methyl, biphenyl, chloroneb, etridiazole; phospholipid biosynthesis and cell wall deposition: dimethomorph, flumorph, mandipropamid, pyrimorph, benthiavalicarb, iprovalicarb, valifenalate and
  - compounds affecting cell membrane permeability and fatty acides: propamocarb, propamocarb-hydrochloridfatty acid amide
- Inhibitors with Multi Site Action
  - Inorganic active substances: Bordeaux mixture, copper acetate, copper hydroxide, copper oxychloride, basic copper sulfate, sulfur; thio- and dithiocarbamates: ferbam, mancozeb, maneb, metam, metiram, propineb, thiram, zineb, ziram; organochlorine compounds (e.g. phthalimides, sulfamides, chloronitriles): anilazine, chlorothalonil, captafol, captan, folpet, dichlofluanid, dichlorophen, hexachlorobenzene, pentachlorphenole and its salts, phthalide, tolylfluanid, and others: guanidine, dodine, dodine free base, guazatine, guazatine-acetate, iminoctadine, iminoctadine-triacetate, iminoctadinetris(albesilate), dithianon, Cell wall synthesis inhibitors
Inhibitors of glucan synthesis: validamycin, polyoxin B; melanin synthesis inhibitors: pyroquilon, tricyclazole, carpropamid, dicyclomet, fenoxanil;

Plant defence inducers
acibenzolar-S-methyl, probenazole, isotianil, tiadinil, prohexadione-calcium; phosphonates: fosetyl, fosetyl-aluminum, phosphorous acid and its salts;

Unknown mode of action
bronopol, chinomethionat, cyflufenamid, cymoxanil, dazomet, debacarb, diclomezine, difenzoquat, difenzoquat-methylsulfate, diphenylamin, fenpyrazamine, flumetover, flusulfamide, flutianil, methasulfocarb, nitrapyrin, nitrothal-isopropyl, oxinecopper, picarbutrazox, proquinazid, tebufloquin, tecloftalam, triazoxide, Insecticidal compounds may be selected from the group consisting of:

Acetylcholine esterase inhibitors from the class of carbamates: aldicarb, alanycarb, bendiocarb, benfuracarb, butocarboxim, butoxycarboxim, carbaryl, carbofuran, carbosulfan, ethiofencarb, fenobucarb, formetanate, furathiocarb, isoprocarb, methiocarb, methomyl, metolcarb, oxamyl, pirimicarb, propoxur, thiodicarb, thiofanox, trimethacarb, XMC, xylylcarb, and triazamate;

Acetylcholine esterase inhibitors from the class of organophosphates: acephate, azamethiphos, azinphosethyl, azinphosmethyl, cadusafos, chlorethoxyfos, chlorfenvinphos, chlormephos, chlorpyrifos, chlorpyrifos-methyl, coumaphos, cyanophos, demeton-S-methyl, diazinon, dichlorvos/DDVP, dicrotophos, dimethoate, dimethylvinphos, disulfoton, EPN, ethion, ethoprophos, famphur, fenamiphos, fenitrothion, fenthion, fosthiazate, heptenophos, imicyafos, isofenphos, isopropyl O-(methoxyaminothio-phosphoryl)salicylate, isoxathion, malathion, mecarbam, methamidophos, methidathion, mevinphos, monocrotophos, nalad, omethoate, oxydemeton-methyl, parathion, parathion-methyl, phenthoate, phorate, phosalone, phosmet, phosphamidon, phoxim, pirimiphos-methyl, profenofos, propetamphos, prothiofos, pyraclofos, pyridaphenthion, quinalphos, sulfotep, tebupirimfos, temephos, terbufos, tetrachlorvinphos, thiometon, triazophos, trichlorfon, vamidothion;

GABA-gated chloride channel antagonists:
Cyclodiene organochlorine compounds: endosulfan; or M-2.B fiproles (phenylpyrazoles): ethiprole, fipronil, flufiprole, pyrafluprole, or pyriprole;

Sodium channel modulators from the class of pyrethroids: acrinathrin, allethrin, d-cis-trans allethrin, d-trans allethrin, bifenthrin, bioallethrin, bioallethrin S-cyclopentenyl, bioresmethrin, cycloprothrin, cyfluthrin, beta-cyfluthrin, cyhalothrin, lambda-cyhalothrin, gamma-cyhalothrin, cypermethrin, alpha-cypermethrin, beta-cypermethrin, theta-cypermethrin, zeta-cypermethrin, cyphenothrin, deltamethrin, momfluorothrin, empenthrin, esfenvalerate, etofenprox, fenpropathrin, fenvalerate, flucythrinate, flumethrin, tau-fluvalinate, halfenprox, imiprothrin, meperfluthrin, metofluthrin, permethrin, phenothrin, prallethrin, profluthrin, pyrethrin (pyrethrum), resmethrin, silafluofen, tefluthrin, tetramethylfluthrin, tetramethrin, tralomethrin, transfluthrin, DDT and methoxychlor;

Nicotinic acteylcholine receptor agonists from the class of neonicotinoids: acteamiprid, chlothianidin, cycloxaprid, dinotefuran, flupyradifurone, imidacloprid, nitenpyram, sulfoxaflor, thiacloprid, thiamethoxam;

Allosteric nicotinic acteylcholine receptor activators from the class of spinosyns: spinosad, spinetoram;

Chloride channel activators from the class of mectins: abamectin, emamectin benzoate, ivermectin, lepimectin or milbemectin;

Juvenile hormone mimics: hydroprene, kinoprene, methoprene, fenoxycarb or pyriproxyfen;

Non-specific multi-site inhibitors: methyl bromide and other alkyl halides, chloropicrin, sulfuryl fluoride, borax or tartar emetic;

Selective homopteran feeding blockers: pymetrozine, flonicamid, pyrifluquinazon, Mite growth inhibitors: clofentezine, hexythiazox, diflovidazin or etoxazole;

Inhibitors of mitochondrial ATP synthase: diafenthiuron, azocyclotin, cyhexatin, fenbutatin oxide, propargite, or tetradifon;

Uncouplers of oxidative phosphorylation: chlorfenapyr, DNOC, or sulfluramid; M-13 nicotinic acetylcholine receptor channel blockers: bensultap, cartap hydrochloride, thiocyclam, thiosultap sodium;

Inhibitors of the chitin biosynthesis type 0 (benzoylurea class): bistrifluron, chlorfluazuron, diflubenzuron, flucycloxuron, flufenoxuron, hexaflumuron, lufenuron, novaluron, noviflumuron, teflubenzuron, triflumuron;

Inhibitors of the chitin biosynthesis type 1: buprofezin;

Moulting disruptors: cyromazine;

Ecdyson receptor agonists: methoxyfenozide, tebufenozide, halofenozide, fufenozide or chromafenozide;

Octopamin receptor agonists: amitraz;

Mitochondrial complex III electron transport inhibitors: hydramethylnon, acequinocyl, flometoquin, fluacrypyrim or pyriminostrobin;

Mitochondrial complex I electron transport inhibitors: fenazaquin, fenpyroximate, pyrimidifen, pyridaben, tebufenpyrad, tolfenpyrad, flufenerim, or rotenone;

Voltage-dependent sodium channel blockers: indoxacarb, metaflumizone

Inhibitors of the lipid synthesis, inhibitors of acetyl CoA carboxylase: spirodiclofen, spiromesifen or spirotetramat;

Mitochondrial complex II electron transport inhibitors: cyenopyrafen, cyflumetofen or pyflubumide; and Ryanodine receptor-modulators from the class of diamides: flubendiamide, chloranthraniliprole (rynaxypyr), cyanthraniliprole (cyazypyr), Others: afidopyropen.

As used herein, "biocontrol product" is defined as agents or products that use natural mechanisms. They form a set of tools that can be used, alone or in combination with other plant protection methods, to combat crop enemies in integrated pest management. There are four main types of biocontrol agents:

Auxiliary macro-organisms (to fight aggressors): invertebrates, insects, mites or nematodes used in an integrated approach to protect crops from bio-aggressors.

Phytopharmaceutical products, including: Micro-organisms (to control aggressors): fungi, bacteria and viruses used to protect crops from pests and diseases, or boost plant vitality.

Chemical mediators: insect pheromones and kairomones. These can be used to track the flights of insect pests and control insect populations through mating disruption or trapping.

Natural substances: these substances obtained from plant, microbial, animal or mineral sources are found in the natural environment and used as biocontrol products.

The traditional treatment of cultivated plants consists in applying active ingredients (a phytopharmaceutical product and/or a biocontrol product and/or a nutrient) to the cultivated plant in particular, where they provide an effect by the sole means of an interaction with the surface of the plant. Given the protective role played by the cuticle, they undergo little or no penetration into the plant by means of passive diffusion.

Unexpectedly, the Applicant has noted that when the combination of phytosterols and of surfactants of the invention is combined with at least one active ingredient, this facilitates the diffusion and passive penetration of the active ingredient into the plant cell by means of the cuticle and plant cell membrane passage mechanisms which were described previously. The composition or the slurry described in the invention therefore allows the presence of a higher concentration or quantity of active ingredient in the plant. On condition that the composition or slurry is applied preferably prior to the onset of the stress, a systemic action of the active ingredient in the plant is observed, leading in turn to an enhanced fight against biotic stresses. In addition, the composition or slurry makes it possible to decrease the doses of active ingredients used while guaranteeing the improved effectiveness of these active ingredients.

The invention relates to the composition above disclosed, said composition containing at least one active ingredient as above mentioned.

Another object of the invention is also an agricultural kit containing separately the composition of the invention (before dilution) and at least one active ingredient as described above.

In use, the composition of the invention may be mixed by the farmer with an effective amount of the active ingredient and then diluted in order to obtain a slurry which is applied on the plant.

Another option is to dilute the composition of the invention in order to obtain the slurry and only then, to add to the slurry the at least one active ingredient.

In a specific embodiment, the invention concerns a composition as disclosed above, i.e a multiphase agricultural composition in the form of a suspo-emulsion, comprising lipophilic droplets containing a mixture of phytosterols, said lipophilic droplets being dispersed in an aqueous phase. The composition further comprising:

at least one first surfactant (SF1) located at the interface of the lipophilic droplets and of the aqueous phase and selected from among the SFs that are soluble in the aqueous phase (WATER SF1) and the SFs that are soluble in the lipophilic droplets (OIL SF1); and at least one second surfactant (SF2) suspended in the aqueous phase, said second surfactant having the form of particles insoluble in the aqueous phase, and at least one nutrient, organic or inorganic, advantageously boron and molybdenum compounds.

In the context of the invention, the expression "boron compound" and "molybdenum compound" cover all chemical compounds that present themselves into the form of a chemical element, a molecule (organic, inorganic or organometallic), a covalent compound or a salt.

According to a specific embodiment, boron (B) and molybdenum (Mo) compounds form a single molecule chosen from the group comprising molybdenum boride or dimolybdenum monoboride or combination thereof.

Depending on their form and nature, boron and molybdenum compounds may be present in the aqueous phase as a water-soluble salt or as an acid, in the lipophilic droplets as an organometallic molecule or both in aqueous phase and in the lipophilic droplets.

When boron compound is added to the composition of the invention, it may be added as a water-soluble salt or as an acid. When it is added as a water-soluble salt, the salt is chosen from the group comprising sodium tetraborate (borax), or any other salt which contains at least, one, two, three or four boron atoms in its chemical formula, taken alone or in combination of these.

Practically, the boron compound-containing salt may be anhydrous or complexed with a plurality of water molecules.

Preferentially, the boron compound is added as an acid and is boric acid.

When molybdenum compound is added to the composition of the invention as a water-soluble salt, the salt is chosen from the group comprising sodium molybdate, ammonium molybdate, molybdenum disilicide, molybdenum(IV) disulphide, molybdenum(IV) oxide, molybdenum(VI) oxide.

Practically, the Mo compound-containing salt may be anhydrous or complexed with a plurality of water molecules.

Preferentially, the Mo salt is sodium molybdate dihydrate.

In a preferred embodiment, Mo compound is added as a water salt and Bo is added as an acid, advantageously boric acid and sodium molybdate dihydrate.

When boron compound is added to the composition of the invention as a boron compound-containing organometallic molecule, it is chosen from the group comprising alkylboronic acids (methylboronic acid, ethylboronic acid, propylboronic acid, phenylboronic acid), trimethylboroxine, trimethoxyboroxine, borate compounds (trimethylborate, triethylborate, tripropylborate, triphenylborate and other di- or tri-alkylsubstituted borate compounds), borane compounds (trimethylborane, triethylborane, tripropylborane, triphenylborane and other di- or tri-alkylsubstituted borane compounds), pinacol ester of boronic acids (phenylboronic pinacol ester, benzylboronic pinacol ester, bis(pinacolato) diboron and alkyl-substituted pinacol esters of boronic acid), isomers or closo-carboranes (ortho-, meto- and para-carborane), taken alone or in combination of these.

When molybdenum compound is added to the composition of the invention as an organometallic molecule, it is chosen from the group comprising dimolybdenum tetraacetate, molybdenum stearate and other carboxylic acids of molybdenum wherein the carboxylate ligand is between 2 and 18 carbons.

Advantageously, boron and molybdenum compounds are present in the aqueous phase.

In use and according to a preferred embodiment, the composition of the invention containing boron and molybdenum compounds is diluted in order to obtain a slurry which is applied on the plant.

In that embodiment, the applicant has noted that the composition was particularly efficient when the concentration of boron and molybdenum compounds is comprised between 0.002 and 2% by weight of the total composition before dilution, i.e before obtaining the slurry.

When the composition contains boron (B) and molybdenum (Mo) compounds as nutrients, their concentrations is respectively comprised between 0.01-2 wt %, preferably 0.5-1.8 wt %, preferably about 1.5 wt % of at least a boron compound and between 0.002-1 wt %, preferably 0.003-0.5 wt %, preferably about 0.25 wt % of at least a molybdenum compound.

Practically the boron (B) compound/molybdenum (Mo) compound ratio is comprised between 0.1 and 10.

In a specific embodiment, the invention concerns a multiphase agricultural composition in the form of a suspoemulsion as disclosed above, comprising lipophilic droplets containing a mixture of phytosterols comprising β-sitosterol, which represents at least 30% of the phytosterols mixture by weight, with the balance to 100% containing, where appropriate, campesterol, stigmasterol and brassicasterol, said lipophilic droplets being dispersed in an aqueous phase, the composition further comprising:
- at least one first surfactant (SF1) located at the interface of the lipophilic droplets and of the aqueous phase, said SF1 being soluble in the lipophilic droplets (OIL SF1); and
- at least one second surfactant (SF2) suspended in the aqueous phase, said second surfactant having the form of particles insoluble in the aqueous phase, wherein SF1 and SF2 are sucrose stearate, and
- between 0.01-2 wt %, preferably 0.5-1.8 wt %, preferably about 1.5 wt % of at least a boron compound, and
- between 0.002-1 wt %, preferably 0.003-0.5 wt %, preferably about 0.25 wt % of at least a molybdenum compound.

In that embodiment, the mixture of phytosterols represents preferably between 0.2% and 10% of the composition by weight, advantageously between 0.5% and 7%, and preferably between 1% and 5%.

Advantageously, the first surfactant represents between 0.2% and 10% of the composition by weight, and the second surfactant represents between 0.01% and 5% of the composition by weight, advantageously, the boron compound is boric acid and the molybdenum compound is sodium molybdate dihydrate, and are preferably present in the aqueous phase. If required, the composition further comprises at least one active ingredient selected from the group comprising:
- phytopharmaceutical product such as a plant growth regulator, a fungicide, a fungistatic agent, a bactericide, a bacteriostatic agent, an insecticide, an acaricide, a parasiticide, a nematicide, a talpicide or a herbicide;
- a biocontrol product based on natural mechanisms that enables plants to combat fungal infections, bacterial infections, viral infections, pest attacks and/or competition with weeds.

Another option is to dilute the composition not containing boron and molybdenum compounds with water containing boron and molybdenum compounds in order to obtain the slurry. In that case, concentration of boron and molybdenum compounds is adapted in consequences.

In another aspect, the invention relates to a method of manufacture for the previously described multiphase composition that is composed of the following steps:
- a) preparation of the lipophilic phase comprising heating the mixture of phytosterols;
- b) simultaneously with step a) or before step a), preparation of the aqueous phase comprising heating said aqueous phase;
- c) simultaneously, addition of the first surfactant OIL SF1 to the lipophilic phase of step a) and/or addition of the first surfactant WATER SF1 to the aqueous phase b);
- d) mixing and stirring of the lipophilic phase with of the aqueous phase until an emulsion is obtained;
- e) cooling of the emulsion;
- f) addition of the second surfactant (SF2) to the emulsion thus obtained under stirring, preferably at ambient temperature of between 20° C. and 25° C., until a homogeneous suspension of the solid particles in the aqueous phase is obtained.

When present, a fluidifying agent, a solubilizing agent, and advantageously a wetting agent are added to the lipophilic phase and, where necessary, a chelating agent, a preservative, and/or and antioxidant are added to the aqueous phase.

In some embodiments, wetting agent may be used in the water phase and antioxidant may be added in the oil phase.

According to a specific embodiment, the first surfactant, in this case OIL SF1, is identical to the second surfactant (SF2) so that the surfactant that is present at the interface of the oil droplets and the aqueous phase of the dispersion is identical to the surfactant that is present in the aqueous phase in the form of solid particles.

According to a specific embodiment, the fluidifying agent is polyethylene glycol, and advantageously polyethylene glycol with a molar mass of 200 or 400 g/mol.

According to a specific embodiment, the wetting agent is a mixture of fatty acid methyl esters, preferably comprising methyl tetradecanoate, methyl octadecanoate and methylhexadecanoate.

In practice,
- preparation of the lipophilic phase is conducted at a high-temperature, preferably in a range between about 70° C. to about 140° C., preferably between about 90° C. to about 120° C., more preferably about 110° C.;
- preparation of the aqueous phase is conducted at a high-temperature, preferably in a range between about 50° C. to about 90° C., preferably between about 70° C. to about 90° C., more preferably about 80° C.;
- stirring is conducted until an emulsion of lipophilic droplets is obtained, preferably at least 90% of said lipophilic droplets having a diameter comprised between 0.01 and 70 µm, preferably between 0.1 and 50 µm, most preferably between 0.1 and 20 µm with a peak maximum less than 10 µm, advantageously between 0.5 to 7 m, preferably between 2 and 6 µm as determined by laser diffraction,
- cooling of the emulsion is conducted until temperature of between 20° C. and 30° C., preferably between 20° C. and 25° C. is reached,
- addition of the second surfactant (SF2) to the emulsion is conducted until an homogeneous suspension of the solid particles in the aqueous phase is obtained, preferably at least 90% of the particles have a diameter comprised between 1 and 1000 µm, advantageously between and 250 µm with a peak maximum preferably of between 10 µm and 100 µm as determined by laser diffraction.

According to the invention, boron and molybdenum compounds are added in the aqueous phase and/or in the lipophilic phase before the emulsion is formed and/or directly in the emulsion after the emulsion is formed.

Depending on the chemical form of boron and molybdenum compounds (acid, water soluble salt or organometallic molecule), it is added either in the lipophilic phase, or in the water phase, or in both the lipophilic phase and the water phase before the emulsion is formed and/or directly in the emulsion after the emulsion is formed.

When the composition contains boron and molybdenum compounds present as acid, water soluble salt(s), boron and molybdenum compounds are added either in the aqueous phase (practically step b) above), before the emulsion is formed, or directly in the emulsion after the emulsion is formed (practically from the end of step d) to the end of step f)).

When the composition contains boron and molybdenum compounds present as an organometallic molecule(s), boron and molybdenum compounds are added in the lipophilic phase (practically step a) above).

According to a specific embodiment, where the composition contains boron (B) and molybdenum (Mo) compounds, they are added in the aqueous phase, between step b) and c) as described above.

According to another embodiment, where the composition contains boron (B) and molybdenum (Mo) compounds, they are added directly in the emulsion after the emulsion is formed (practically from the end of step d) to the end of step f)).

The invention also relates to a composition obtainable by the above-mentioned process.

According to another aspect, the invention relates to the use of the composition or slurry described previously in order to prevent the exposure of a cultivated plant to a biotic and/or abiotic stress.

The invention thus also relates to a preventive treatment process for a cultivated plant that aims to limit the loss of dry matter related to an abiotic and/or biotic stress; it consists in applying to the plant, prior to the onset of said abiotic and/or biotic stress, the composition or the slurry previously described.

Advantageously, within the meaning of the invention, the plant is cultivated in fields or under controlled conditions, for example using hydroponics, in a pot or in a greenhouse; preferably, in the context of the invention, the plant is cultivated in a field.

In general, abiotic stress is responsible for a decrease in yield or in production of dry matter and results from drought (a lack of water, or water stress), extreme temperatures (thermal stress), excess water (flooding), frost, wind, soil salinity (salt stress), ultraviolet radiation, insufficient access to certain nutrients, soil with stress-inducing characteristics (chemical composition, redox potential, etc.) or physical damage, and advantageously drought and/or extreme temperatures.

According to a specific embodiment, abiotic stress corresponds to water stress. In another embodiment, abiotic stress corresponds to thermal stress.

For the purposes of the invention, the term "water stress" refers to a state in which the water content of the cultivated plant is lower than the wilting point.

For the purposes of the invention, the phrase "prior to the onset of abiotic stress," particularly with regard to water stress, refers to the period during which the useful soil water reserve is properly filled, i.e., the time elapsed from the moment when the useful soil water reserve is sufficiently or completely full (field capacity) to the moment when the wilting point is reached.

For the purposes of the invention, the phrase "prior to the onset of abiotic stress," particularly with regard to thermal stress (or extreme temperatures), refers to the period before the point of vulnerability to frost and/or flower blast for each plant species and each developmental stage of these species. In other words, it refers to temperatures that are unfavorable to the growth and development of the plant, apart from all other crop conditions, such as water supply.

As regards drought, the Applicant has noted that the composition or slurry of the invention, when applied preventively to the cultivated plant, i.e., prior to the occurrence of abiotic stress, induces a closure of the stomata and therefore a decrease in evapotranspiration. Consequently, the plant's water consumption is reduced without causing a decrease in yield, i.e., in the production of dry matter.

In other words, the invention also relates to a process for reducing the consumption of water by a cultivated plant under conditions of water stress that consists in applying to said plant, prior to the onset of water stress, the composition or slurry previously described.

The Applicant has noted that the composition was especially efficient for this specific effect on plants chosen from the group of soybean, corn, sunflower.

In practice, the biological mechanisms brought into play by the composition or slurry of the invention, especially at particularly low levels of phytosterols and therefore of β-sitosterol, lead to a stimulation of the vigor of the plant that provides the plant with improved resistance to water stress:
- the stimulation of the development of the root system increases the water supply accessible to the plant;
- the message sent by the β-sitosterol in the plant induces the partial closure of the stomata, thereby limiting water losses due to evapotranspiration.

For the purposes of the invention, the phrase "stimulation of the vigor of the plant" refers for example to a stimulation of various metabolic pathways of the plant that improve the plant's resistance to water stress.

Advantageously, the biological mechanisms described above lead to an improvement in the overall vigor of the plant and more generally the health of the plant.

The term "health of a plant" or "plant health" is defined as a condition of the plant and/or its products which is determined by several aspects alone or in combination with each other such as increased yield, plant vigor, quality of harvested plant parts and tolerance to abiotic and/or biotic stress.

The extent of the water supply accessible to the plant and the rate of consumption of this supply are therefore modulated by the signals whose transmission involves phytosterols, in particular β-sitosterol. These two mechanisms lead to an optimized consumption of accessible water by the plant.

More precisely, an effect of tolerance to water stress is observed; this effect is notably induced by β-sitosterol as used in the invention, as well as by the application of the composition or slurry prior to exposure to stress.

In a particular embodiment, the invention relates to a preventive treatment process for a cultivated plant that aims to limit the loss of dry matter related to salt stress; it consists in applying to the plant the composition or slurry previously described.

According to a specific embodiment, as regards biotic stress resulting in a decrease in yield or in dry matter production, this can be caused by the harmful action of a plant pathogen living on the cultivated plants, whether a fungal infection and/or a bacterial infection and/or a viral infection and/or a pest attack and/or competition with weeds.

For example, a fungal infection of the plant can be mildew on grapes, tomatoes or potatoes, *septoria* on wheat, rynchospora on barley, or powdery mildew on straw cereals and grapes; a bacterial infection of the plant can be crown gall, bacterial canker or fire flight; a viral infection of the plant can be mosaic diseases or yellow dwarf viruses; pests capable of attacking a cultivated plant include aphids, flea beetles or weevils.

In particular, the composition or slurry of the invention helps to reduce the intensity of a fungal disease, advantageously without affecting its frequency.

For the purposes of the invention, the phrase "prior to the onset of biotic stress," in particular with regard to a fungal infection, refers to the period before the first symptoms appear, for example before the first spots appear on the leaves and/or stems of the cultivated plant.

For the purposes of the invention, the phrase "intensity of the fungal disease" refers to the average intensity of the disease on all of the leaves of the cultivated plant. The intensity of the disease on one leaf is the surface area of the leaf that is covered by the disease.

For the purposes of the invention, the phrase "frequency of the fungal disease" refers to the number of leaves on which the disease or spots can be observed.

It follows from the above that the composition or slurry of the invention, when applied to the plant prior to the onset of an infection, particularly a fungal infection, leads to a decrease in the surface area of the spotting or discoloration of the leaf compared to a plant that has not received the preventive treatment of the invention.

The Applicant has also noted that the composition or slurry of the invention improves the growth and development of the plant, and particularly that of the young seedling when the slurry is applied prior to the onset of the stress. In particular, these improvements are even more advantageous when the slurry is applied via seed imbibition.

The invention therefore also relates to a process for stimulating the growth and development of the young seedlings that consists in applying the composition or slurry previously described prior to the onset of an abiotic and/or biotic stress, preferably via seed imbibition. The process of the invention therefore limits the period of time during which the young seedling is exposed to abiotic and/or biotic stresses. Furthermore, the effect of the product applied via seed imbibition lasts over time, since the plants treated with the composition or slurry of the invention are more tolerant to an abiotic and/or biotic stress.

In practice, the young seedling is more fragile than the adult plant with respect to abiotic and/or biotic stresses. A young seedling that has been treated with the composition or slurry of the invention reaches a state of complete maturity (the adult plant stage) more quickly than a seedling that has not received this treatment.

Unexpectedly, the Applicant has noted that the first and second surfactants of the invention modify the state of the cuticle, making it permeable, i.e., they allow the mixture of phytosterols to penetrate inward to reach the internal components of the leaf or the plant, for example the plant cells.

In other words, the surfactants of the invention facilitate the crossing of the seed coat barrier and even the rupturing of the seed coats, and therefore accelerate germination. Next, the exogenous contribution of the mixture of phytosterols, particularly S-sitosterol, helps stimulate the growth and development of the seedling. The composition or slurry of the invention thus allows for an effective exogenous supply of phytosterols, notably β-sitosterol, possibly combined with one or several active ingredients, through the combination of a suitable composition and a system enabling the delivery of the phytosterols in the form of particles of a specific size, as mentioned previously.

For the purposes of the invention, the phrase "delivery of the phytosterols" refers to the transport of the phytosterols, which are hydrophobic, by means of the aqueous phase.

Furthermore, the second surfactant, which is present in the form of solid particles in suspension in the aqueous phase of the composition of the invention, helps solubilize the epicuticular waxes and provides facilitated pathways through the cuticle for the constituent compounds of said composition.

It follows from the above that the period during which the seedling could be subjected to stresses is shortened.

The fact that the compounds of the invention are not products that perform a specific type of activity, such as fungicides or biocides, makes it possible to consider an extensive spectrum of uses for a wide variety of crops, which can in particular improve the protection and therefore the profitability of minor crops for which the number of available phytopharmaceutical products is almost zero.

In practice, the composition or slurry of the invention is applied by spraying the leaves, by sprinkling, irrigation, seed imbibition, seed coating, drip irrigation or gravity irrigation of the cultivated plant, by incorporation into the soil, by addition to a hydroponic crop medium or by immersion.

For the purposes of the invention:
the term "foliar spraying" refers to a pressurized projection of slurry that forms a large number of microdroplets that cover the upper and/or lower surfaces of the leaf;
the term "irrigation" refers to the addition of a supply of water to the soil solution that is taken up by the root system of the plant; and
the term "seed imbibition" refers to an immersion of the seed in a solution containing the composition.

Advantageously, the composition is applied to the cultivated plant by foliar spraying at a dose of composition of 0.1 L/ha (hectare) to 15 L/ha, preferably 1 L/ha to 5 L/ha. Practically, the required dose of the composition is diluted in water in order to obtain a slurry. The slurry is then applied on the plant at a volume of between 30 and 400 L/ha, advantageously between 50 and 200 L/ha.

In a specific embodiment, the composition contains 2.5% by weight of phytosterols and the required dose of composition ranges from 1 L/ha to 5 L/ha. This means that the dose of phytosterols which is applied on the plant is between 25 to 125 g/ha. Practically, the composition of the invention may not be applied directly on the plant and needs to be diluted to form a slurry. In the present embodiment, the slurry is applied on the plant, especially by foliar spraying at a volume of 50 to 200 L/ha.

The slurry is preferably applied during a stage when the plant leaves cover the soil.

Advantageously, the slurry of the invention is applied only one time by foliar spraying and/or irrigation and/or seed imbibition.

The invention also relates to the use of the composition or slurry as described previously:
to increase the tolerance of a cultivated plant to an abiotic stress and/or;
to decrease the intensity of a biotic stress affecting a cultivated plant.

The invention also relates to the use of the composition or slurry as described previously as a biostimulant for a cultivated plant.

The invention also relates to the use of the composition or slurry as described previously to improve the yield or dry matter production of a cultivated plant.

The invention also relates to the use of the composition or slurry as described previously to promote deeper root development for a cultivated plant.

The invention also relates to the use of the composition or slurry as described previously to control the opening or closing of the stomata of a cultivated plant.

The invention also relates to the use of the composition or slurry as described previously to improve the vegetative development and/or the flowering of a cultivated plant.

The invention also relates to the use of a composition comprising a mixture of phytosterols and of surfactants, notably polyols, and in particular of the composition or slurry as described previously, to strengthen the stem of the crop plant and improve its tolerance to physiological lodging. the adverse effects of lodging, which can include lower seed filling, loss of quality, yield loss and harvesting difficulties.

The invention also relates to the use of the composition or slurry as described previously to improve the effectiveness of phytopharmaceutical fungicide or biocontrol products.

According to a specific embodiment, the cultivated plant is a chlorophyllian plant, advantageously selected from among the group comprising field crops of cereals, oilseeds and protein crops; grapes; plants with roots and tubers; horticultural plants; grass; vegetables; herbs and spices; tree crops; or industrial crops intended for the production of raw material for processing. Preferably the cultivated plant is selected from among the group comprising soybeans, corn, barley, millet, moha, miscanthus, panicum, sorghum, peanuts, wheat, rapeseed, sunflower, protein peas, field peas, field beans, lupins, flax, truncated alfalfa, grapes, beets, potatoes, beans, lettuce, parsley and radishes.

The composition, the slurry, the method of manufacture of the composition of the invention, the treatment process for preventing an abiotic and/or biotic stress, as well as the uses previously described, present the advantages of corresponding exactly to societal demands relating to phytopharmaceutical products:

- Can be applied in the field and present a phystosterol concentration that is effective for stimulating crop plant growth and coping with an abiotic and/or biotic stress;
- Environmentally friendly;
- Safe for human health;
- Wide array of uses in terms of crop plant varieties;
- No induced resistance;
- Improved environmental conditions;
- Economic merit;
- Regulatory merit.

The invention and the benefits it produces are more visible in the following figures and examples, which are given in order to illustrate the invention in a non-exhaustive fashion.

BRIEF DESCRIPTION OF THE FIGURES

FIG. 1: particle size distribution of the composition of the invention

FIG. 2: microscope photograph of the composition of the invention

FIGS. 3 and 4 show the deep root development of soybean treated with the composition of the invention under conditions of water stress, with cultivation in microplots.

FIG. 5 shows the yield of a sunflower crop under conditions of water stress, with cultivation in wide strips.

FIG. 6 illustrates the capacity of the composition of the invention to reduce the sensitivity of a grape crop to mildew.

FIG. 7 illustrates the capacity of the composition of the invention to reduce the sensitivity of a grape crop to mildew under the conditions of use employed in typical farming practice.

EXAMPLES OF APPLICATION OF THE INVENTION

1. Preparation of the Compositions According to the Invention 1.1. Formulas of the Compositions (See Table 1)

Any percentage by weight of an compound or a molecule of the invention refers to the total weight of the said invention, which means relative to the sum of all ingredients giving a hundred. This percentage by weight can by symbolized as wt %.

TABLE 1 preparation of the compositions.

| Compound (wt %) | | Exemples | | | | | | | | |
|---|---|---|---|---|---|---|---|---|---|---|
| | | 1 | 2 | 3 | 4 | 5 | 6 | 7 | 8 | 9 |
| Oil phase, 110° C. | Solvent | PEG-400 (3.5) | PEG-200 (3.8) | PEG-200 (3.8) | PEG-200 (3.8) | PEG-400 (3.8) | Rapeseed oil (3.8) | Rapeseed oil (3.8) | Grapeseed oil (3.8) | Rapeseed oil (3.8) |
| | Phytosterols [949109-75-5] | 2.5 | 2.5 | 2.5 | 2.5 | 2.5 | 2.5 | 2.5 | 2.5 | 2.5 |
| | Oil SF1 | Sucrose stearate[1] (6) | Sucrose stearate[2] (4.26) | Sucrose palmitate[3] (4.26) | Sucrose palmitate[3] (4.26) | Sucros stearate[2] (4.26) | Span 85 (2.13) | Span 85 (2.13) | — | Span 20 (4.72) |
| | Methyl tetradecanoate | 0.4 | 0.025 | 0.025 | 0.025 | 0.025 | 0.025 | 0.025 | 0.025 | 0.5 |
| | Methyl hexadenoate | — | 0.15 | 0.15 | 0.15 | 0.15 | 0.15 | 0.15 | 0.15 | |
| | Methyl octadecanoate | — | 0.325 | 0.325 | 0.325 | 0.325 | 0.325 | 0.325 | 0.325 | |

TABLE 1-continued preparation of the compositions.

| | Compound (wt %) | 1 | 2 | 3 | 4 | 5 | 6 | 7 | 8 | 9 |
|---|---|---|---|---|---|---|---|---|---|---|
| Water phase | Water | 84.9 | 87.44 | 87.44 | 87.44 | 87.44 | 87.44 | 87.44 | 87.44 | 85.51 |
| | Water SF1 | — | — | — | — | — | Tween 20 (2.13) | Tween 20 (2.13) | Sucrose stearate[2] (4.26) | Tween 80 (2.47) |
| | Benzyl alcohol | 0.7 | — | — | — | — | — | — | — | — |
| | SF2 | Sucrose stearate[1] (2) | Sucrose palmitate[3] (1.5) | Sucrose stearate[2] (1.5) | Sucrose palmitate3 (1.5) | Soy lecithin (1.5) | Soy lecithin (1.5) | Sucrose stearate[2] (1.5) | Sucrose stearate[2] (1.5) | Sucrose stearate[2] (1.5) |
| | Temperature (° C.) | 80 | 80 | 80 | 80 | 80 | 75 | 75 | 86 | 65 |
| | Dv90 emulsion | 5 | 8 | 7 | 7 | 8 | 40 | 40 | 69 | 5 |
| | Dv90 suspo-emulsion | 70 | 383 | 322 | 391 | 11 | 30 | 55 | 125 | 453 |

Footnotes.
[1]CAS [25168-73-4]
[2]CAS [84066-95-5]
[3]CAS [26446-38-8].

1.2. Manufacture of a Composition:

The various composition according to the invention are manufactured comprising the following steps:

(i) Preparation at about 110° C. of a lipophilic phase comprising phytosterols, oil surfactant SF1 (if any), methyl tetradecanoate, and when present, methyl hexadecanoate, methyl octadecanoate and solvent, (ii) Preparation at a given temperature of a hydrophilic phase comprising water, the water surfactant SF1, if any, and benzyl alcohol if any, (iii) Mixing the lipophilic phase of step (i) with the hydrophilic phase of step (ii) and stirring until at least 90% of the volume of lipophilic droplets with a diameter comprised between 0.1 and 20 μm are obtained, with a maximum peak between 2 and 6 μm as determined by laser diffraction, (iv) Cooling of the emulsion to ambient temperature of about 20° C., and (v) Adding a second surfactant SF2 in the emulsion, at ambient temperature of about 20° C. and stirring until at least 90% of the particles with a diameter comprised between 10 and 250 μm are obtained and suspended in the aqueous phase, with a maximum peak between 10 μm and 1000 μm as determined by laser diffraction.

The particle size distribution and a microscope photograph of the composition 1 are shown respectively on FIGS. 1 and 2.

As shown on FIG. 1:

- at least 90% of lipophilic droplets dispersed in the aqueous phase have a diameter comprised between 0.1 and 20 μm, with a peak maximum between 2 and 6 μm, as determined by laser diffraction,
- at least 90% the second surfactant (SF2) is in the form of particles that have diameter comprised between 10 and 250 μm with a peak maximum preferably of between 10 μm and 100 μm as determined by laser diffraction.

As shown on FIG. 2, particles of the second surfactant (SF2) designated by 1 are much bigger than lipophilic droplets designated by 2.

2. Evaluation of the Capacity of the Slurry as Per Example 1 to Reduce the Sensitivity of a Soybean Crop to Water Stress Under Controlled Conditions This objective of this trial is to demonstrate the effect of the application of the slurry of the invention to soybean, in particular with respect to the consumption of soil water by the plant. The method involves comparing the development and water content of the plants treated with the slurry of the invention (treated modality) to those of untreated plants (control modality) in a context of water stress (no water is supplied for one week following application of the slurry). This evaluation is carried out under the controlled conditions of a laboratory growth chamber.

2.1. Equipment and Methods 2.1.1. Description of the Experimental Setup

The description of the experimental setup is presented in Table 2.

TABLE 2

| | |
|---|---|
| Crop (variety) | Soybean (ES Mentor) |
| Sowing density | 5 plants per pot |
| Setup | 6 pots, i.e., 30 individual plants, corresponding to: 3 pots for the treated modality, i.e., 15 individual plants; and 3 pots for the untreated (control) modality, i.e., 15 individual plants |

2.1.2. Treatment Modalities Considered

The description of the modalities considered is presented in Table 3.

TABLE 3

| Modality | Treatment | Application dose of the composition as per example 1 | Application stage |
|---|---|---|---|
| control | Untreated Control (UC) | — | — |
| treated | Composition according to the example 1 | 1 L/ha | Third trifoliate leaf stage (V3 stage) |

The slurry is obtained by diluting the composition of example 1 in water and is applied only once, by foliar spraying, at a volume of 80 L/ha under the following controlled conditions: temperature of 28° C. and relative humidity of 70%.

2.1.3. Data Collection Method

Several parameters are considered, namely:

the regular monitoring of the developmental stage of the soybean plants, carried out by counting the number of trifoliate leaves;

the evaluation of the water content for each modality. In practice, when the experiment is finished, the weight of fresh matter (FW) is measured for four out of five plants. The plants are then left to dry for 2 weeks in order to determine the weight of dry matter (DW). The calculation (FW−DW)/FW gives the water content of the plant; and the study of a trifoliate leaf taken from the last plant and placed in a desiccator to instantly assess the water content of the plant. This parameter will be combined with the results obtained from the dry matter measurements.

2.2. Results

The results are presented in Table 4.

TABLE 4

| Treatment modality | Evolution of vegetative development (number of trifoliate leaves counted) | Water content per 100 g of fresh leaves (4 out of 5 plants) (FW-DW)/FW | Water content (desiccator) |
|---|---|---|---|
| Control modality | −3.36% | 40.68% | 28.61% |
| Treated modality (composition as per example 1) | +14.79% | 57.98% | 50.10% |

2.3. Conclusion

This trial shows that when the slurry of the invention is applied to soybean at an early stage of development (V3 stage), improved vegetative development is obtained (the number of leaves increases by 14.79%) along with greater water content following a period of water stress. Meanwhile, under conditions of water stress, the control modality plants lose their leaves (−3.36%), and their water content is lower than that of the treated plants.

This evidence shows that under identical growth conditions, a plant that has been treated with the slurry of the invention optimizes its consumption of soil water in order to increase its growth and limit its desiccation. The moment at which the water reserve reaches the wilting point is therefore delayed, and the plant remains in its hydrological comfort zone (i.e., the EUSWR) for a longer period of time.

3. Evaluation of the Capacity of the Slurry as Per Example 1 to Reduce the Sensitivity of a Soybean Crop to Water Stress Under Real Conditions, with Cultivation in Microplots This objective of this trial is to demonstrate that the application of the slurry as per example 1 to soybean results in a slowdown in soil water consumption by the plant. The method involves evaluating the yield of the plants treated with the slurry of the invention (treated modality) compared to that of the untreated plants (control modality) in a context in which the water needs of the plant are not met. This evaluation is carried out in the field.

3.1. Equipment and Methods 3.1.1. Description of the Experimental Setup

The description of the experimental setup is presented in Table 5.

TABLE 5

| | |
|---|---|
| Crop (variety) | Soybean (ES Mentor) |
| Sowing density | 680 000 seeds/ha |
| Setup | 4 repeated trials performed on 2 microplots of 25 m$^2$ each, for the untreated (control) modality; and 4 repeated trials performed on 2 microplots of 25 m$^2$ each, for the treated modality. |

3.1.2. Modalities Considered

The description of the modalities considered is presented in Table 6.

TABLE 6

| Modality | Treatment | Application dose of the composition as per example 1 | Application stage |
|---|---|---|---|
| control | Untreated Control (UC) | — | — |
| treated | Composition according to the example 1 | 3 L/ha | Third trifoliate leaf stage (V3 stage) |

The slurry is obtained by diluting the composition of example 1 in water and is applied only once, by foliar spraying, at a volume of 80 L/ha under the following conditions: temperature of 22° C., relative humidity of 75% and no wind.

3.1.3. Data Collection Method

The microplots corresponding to the different modalities were observed using NDVI imaging performed by a drone. A 60 cm capacitive probe was used to evaluate the water reserve of the plants according to the treatment modality being considered. Indeed, such a probe makes it possible to determine the kinetics of water consumption as well as the depth and extent of the root system of the plants. The capacitive probes were inserted during the last of four repeated trials (see section 3.1.2), with one probe used for the control modality and another for the modality treated with the slurry of the invention. On the day of harvest, the different microplots were harvested separately, and the yields were studied. An additional analysis was performed by examining the components of this yield.

3.2. Results 3.2.1. Capacitive Probes

The level of depth of the roots is shown in FIGS. 3 to 4.

The data pertaining to this level of depth, in particular the step shapes, indicate that the root development at lower depths is more advanced for the treated modality than for the control modality. Indeed, the steps become evident more rapidly at the depths of 45 and 55 cm (FIGS. 3 and 4, respectively).

3.2.2. Yields

The results are presented in Table 7.

TABLE 7

| Modality | Yield (number of seeds × weight of each seed) | Seed humidity (in %) | Thousand Kernel Weight (or TKW; in g) | Number of pods per plant | Number of seeds per pod |
|---|---|---|---|---|---|
| Control modality | 35.7 | 17.7 | 225.8 | 26.1 | 2.5 |
| Treated modality composition as per the invention 1 | 40.1 | 16.5 | 234.2 | 21.5 | 2.5 |

3.3. Conclusion

This trial shows that when the slurry of the invention is applied to soybean at an early stage of development (V3 stage), improved use of soil water is obtained, in particular through deeper root development. Consequently, a plant that has been treated with the slurry of the invention benefits from a greater water reserve, i.e., from a greater quantity of available water, which allows it to better withstand water stress compared to a plant in the untreated (control) modality.

This decrease in sensitivity to water stress observed for the plants that have been treated with the slurry results in a yield gain of +12.6% for the treated modality compared to a yield of 37.7 ql/ha for the control modality. This effect can notably be explained by the data given in Table 7, which shows that all components of this yield were improved. In particular, the cultivated plants that had undergone treatment present a higher TKW value. In other words, the treated plant was less affected by water stress at the time at the end of the cycle when its seeds were being filled.

4. Evaluation of the Capacity of the Slurry as Per Example 1 to Reduce the Sensitivity of a Soybean Crop to Extreme Water Stress Under Real Conditions, with Cultivation in Microplots 4.1. Equipment and Methods 4.1.1. Description of the Experimental Setup The description of the experimental setup is presented in Table 8.

TABLE 8

| | |
|---|---|
| Crop (variety) | Soybean (ES Mentor) |
| Sowing density | 456 000 seeds/ha |
| Setup | Microplots with 6 repeated trials |

4.1.2. Modalities Considered

The description of the modalities considered is presented in Table 9.

TABLE 9

| Modality | Treatment | Application dose of the composition as per example 1 | Application stage |
|---|---|---|---|
| control | Untreated Control (UC) | — | — |
| treated | Composition according to example 1 | 3 L/ha | From the second trifoliate leaf stage to the beginning bloom stage (from V2 to R1) |

The slurry is obtained by diluting the composition of example 1 in water and is applied only once, by foliar spraying, at a volume of 150 L/ha under the following conditions: temperature of 24° C., relative humidity of 66% and no wind.

This trial is conducted under conditions of extreme water stress induced by the level of rainfall and the soil composition. This is a case of very low rainfall with soybeans being grown in clayey soil (maximum rainfall events of 10 mm that do not make the water available for the plant given the strong retention of water by the clay).

4.2. Results

The results are presented in Table 10.

TABLE 10

| | Height of first pods (cm) | Number of pods per plant | Number of seeds per plant | Yield (ql/ha) | Seed humidity (in %) | TKW (in g) | Protein content (% per 100 g of seeds) |
|---|---|---|---|---|---|---|---|
| Control modality | 7.5 | 27.3 | 47.1 | 14.5 | 16.2 | 149.3 | 46.7 |
| Treated modality | 7.1 | 38 | 66.5 | 22.4 | 15.6 | 163.3 | 45.2 |

4.3. Conclusion

This trial shows that when the slurry of the invention is applied to soybean at an early stage of development (from the V2 stage to the R1 stage), all of the components of the yield are improved under conditions of extreme water stress. Ultimately, this leads to a yield increase of more than 50% for cultivated plants treated with the slurry of the invention compared to those cultivated without treatment.

5. Evaluation of the Capacity of the Slurry of the Invention to Reduce the Sensitivity of a Soybean Crop to Water Stress Under Real Conditions, with Cultivation in Wide Strips 5.1. Equipment and Methods 5.1.1. Description of the Experimental Setup The description of the experimental setup is presented in Table 11.

TABLE 11

| Crop (variety) | Soybean (ES Mentor) |
|---|---|
| Sowing density | 680 000 seeds/ha |
| Setup | Wide strips (0.13 ha) for the untreated (control) modality; and Wide strips (0.13 ha) for the modality treated with the slurry as per example 1 |

5.1.2. Modalities Considered

The description of the modalities considered is presented in Table 12.

TABLE 12

| Modality | Treatment | Application dose of the composition as per example 1 | Application stage |
|---|---|---|---|
| control | Untreated Control (UC) | — | — |
| treated | Composition according to example 1 | 3 L/ha | Third trifoliate leaf stage (V3 stage) |

The slurry is obtained by diluting the composition of example 1 in water and is applied only once, by foliar spraying, at a volume of 80 L/ha under the following conditions: temperature of 21° C., relative humidity of 72% and no wind.

5.2. Results

The results are presented in Table 13.

TABLE 13

| Modality | Yield |
|---|---|
| Control modality | 37.7 |
| Treated modality | 46 |

5.3. Conclusion

This trial shows that when the slurry of the invention is applied to soybean at an early stage of development (V3 stage), an increase in yield of more than +22% is obtained compared to the yield obtained for the untreated plants.

6. Evaluation of the Capacity of the Slurry of the Invention to Reduce the Sensitivity of a Corn Crop to Water Stress Under Real Conditions, with Cultivation in Wide Strips 6.1. Equipment and Methods 6.1.1. Description of the Experimental Setup The description of the experimental setup is presented in Table 14.

TABLE 14

| Crop (variety) | DKC4670 |
|---|---|
| Sowing density | 88 000 seeds/ha |
| Setup | Wide strips (0.11 ha) for the untreated (control) modality; and Wide strips (0.11 ha) for the modality treated with the slurry as per example 1 |

6.1.2. Modalities Considered

The description of the modalities considered is presented in Table 15.

TABLE 15

| Modality | Treatment | Application dose of the composition as per example 1 | Application stage |
|---|---|---|---|
| control | Untreated Control (UC) | — | — |
| treated | Composition according to example 1 | 1 L/ha | 8-10 leaf stage |

The slurry is obtained by diluting the composition of example 1 in water and is applied by foliar spraying, at a volume of 80 L/ha under the following conditions: temperature of 23° C., relative humidity of 76% and no wind.

6.2. Results

The results are presented in Table 16.

TABLE 16

| Modality | Yield |
|---|---|
| Control modality | 133.4 |
| Treated modality | 143.1 |

6.3. Conclusion

This trial shows that when the slurry of the invention is applied to corn at an early stage of development (the 8-10 leaf stage), an increase in yield of +7.3% is obtained compared to that obtained for the untreated corn.

7. Evaluation of the Capacity of the Slurry of the Invention to Reduce the Sensitivity of a Sunflower Crop to Water Stress Under Real Conditions, with Cultivation in Wide Strips 7.1. Equipment and Methods 7.1.1. Description of the Experimental Setup The description of the experimental setup is presented in Table 17.

TABLE 17

| Crop (variety) | Sunflower (Volcano variety) |
|---|---|
| Sowing density | 72 000 seeds/ha |

TABLE 17-continued

| Setup | Wide strips (0.3 ha) for both the untreated (control) modality and the treated modality |

7.1.2. Modalities Considered

The description of the modalities considered is presented in Table 18.

TABLE 18

| Modality | Treatment | Application dose of the composition as per example 1 | Application stage |
|---|---|---|---|
| control | Untreated Control (UC) | — | — |
| treated | Composition according to example 1 | 1 L/ha | Flower bud stage |

The slurry is obtained by diluting the composition of example 1 in water and is applied only once by foliar spraying, at a volume of 80 L/ha under the following conditions: temperature of 21° C., relative humidity of 72% and no wind.

7.1.3. Data Collection Method

See part 3.1.3.

7.2. Results 7.2.1. Capacitive Probes

The results are presented in FIG. 5.

These data show a clear difference in kinetics and rooting depth between the two modalities of sunflower cultivated (with or without treatment).

More precisely, these results show that the wilting point of the sunflower treated with the slurry of the invention is shifted to a lower level, which consequently increases the easily usable soil water reserve (EUSWR) that allows the plant not to be in a situation of stress, i.e., in the soil survival reserve (SSR), for too lengthy a period. This effect is notably induced by deeper rooting for the sunflower treated with the invention.

The analysis of the evolution of cumulative soil humidity (from 5 cm to 55 cm) highlights the fact that the soil survival reserve (SSR) decreases over time for the sunflower treated with the slurry of the invention, but remains at the same level for the control modality sunflower.

The analysis of the daily water consumption trends as a function of soil depth (between 5 cm and 15 cm) demonstrates that the plants that have been treated with the slurry of the invention benefit from a more highly developed root system, and in particular from deeper rooting, allowing the sunflower plants to collect the water necessary for photosynthesis from greater depths when the water becomes difficult to use at a depth of 5 cm.

These results clearly demonstrate that the treatment with the slurry of the invention leads to better soil prospection by the roots.

Therefore, the sunflower treated with the slurry of the invention is below the wilting point for a shorter period (22.5 days) than the untreated sunflower (33 days). The result is an increase in the quantity of dry matter for the modality treated with the slurry compared to the untreated modality.

7.2.2. Yields

The results are presented in Table 19.

TABLE 19

| Modality | Yield |
|---|---|
| Control modality | 39.3 |
| Treated modality | 42.6 |

7.3. Conclusion

This trial shows that when the slurry of the invention is applied to sunflower at an early stage of development (the flower bud stage), an increase in yield of +8.4% is obtained compared to that obtained for the untreated sunflower.

8. Evaluation of the Capacity of the Slurry of the Invention to Strengthen the Stem of the Crop Plant and Improve its Tolerance to Physiological Lodging for Various Major Crops The objective of these trials is to demonstrate that when the slurry of the invention is applied to various major crops, tolerance to lodging is enhanced through a stiffening of the straw and an improvement in stem strength. It must be noted that taller plants are more vulnerable to lodging.

The trials presented herein were carried out under uncontrolled conditions with an experimental setup involving wide strips.

8.1. Barley 8.1.1. Equipment and Methods 8.1.1.1. Description of the Experimental Setup The description of the experimental setup is presented in Table 20.

TABLE 20

| Trial | Barley cultivated in wide strips |
|---|---|
| Crop (variety) | Barley (Amistar) |
| Sowing density | 250 seeds/m$^2$ |
| Soil type | Sandy |
| Setup | Wide strips (0.15 ha) |

8.1.1.2. Modalities Considered

The description of the modalities considered is presented in Table 21.

TABLE 21

| Modality | Treatment | Application dose of the composition as per example 1 | Application stage |
|---|---|---|---|
| control | Untreated Control (UC) | — | — |
| treated | Composition according to example 1 | 3 L/ha | 2 nodes (at T1) |

The slurry is obtained by diluting the composition of example 1 in water and is applied by foliar spraying, at a volume of 80 L/ha under the following conditions: temperature of 17° C. and wind at 10 km/h.

8.1.1.3. Data Collection Method

The effect of the application of the slurry of the invention is evaluated using two parameters:

stem height (between the crown and the ear insertion height): this is a destructive measurement performed on 10 plants per study modality.

extent of lodging: visual observation of the damages caused by lodging, for each study modality.

8.1.1.4. Analysis

The average stem height values are compared based on the heights of 10 stems in each study modality. Visual observations are carried out to evaluate the damage due to lodging.

8.1.2. Results

The results are presented in Table 22.

TABLE 22

| Modality | Application dose of the composition | Increase in average stem height (cm) |
|---|---|---|
| Control modality | — | — |
| Treated modality | 3 L/ha | +5 cm to 10 cm |

No Damage Due to Lodging was Observed for Either Study Modality 8.1.3. Conclusion This trial shows that when the slurry of the invention is applied to barley at a key stage of stem development, taller stems are obtained compared to those of the untreated plants. No damage due to lodging is observed for either of the two study modalities despite the fact that the treated plants developed taller stems and were therefore more vulnerable to lodging.

8.2. Millet 8.2.1. Equipment and Methods 8.2.1.1. Description of the Experimental Setup The description of the experimental setup is presented in Table 23.

TABLE 23

| Trial | Millet cultivated in wide strips |
|---|---|
| Crop (variety) | Millet |
| Sowing density | 500 seeds/m$^2$ |
| Soil type | Sandy-loamy |
| Setup | Wide strips |

8.2.1.2. Modalities Considered

The description of the modalities considered is presented in Table 24.

TABLE 24

| Modality | Treatment | Application dose of the composition as per example 1 | Application stage |
|---|---|---|---|
| control | Untreated Control (UC) | — | — |

TABLE 24-continued

| Modality | Treatment | Application dose of the composition as per example 1 | Application stage |
|---|---|---|---|
| treated | Composition according to example 1 | 1 L/ha | Flag leaf stage (FLS) (at T2) |

The slurry is obtained by diluting the composition of example 1 in water and is applied by foliar spraying, at a volume of 80 L/ha under controlled conditions.

8.2.1.3. Data Collection Method

The plants in the two study modalities were subjected to a visual inspection (drone photographs and naked-eye observations at the edge of the field) to evaluate the extent of damage caused by lodging. In the control modality zone, a large area containing recumbent plants provided evidence of damage due to physiological lodging. Stem height was not evaluated in this trial.

8.2.2. Results

The results are summarized in Table 25.

TABLE 25

| Modality | Application dose of the composition | Damage due to lodging |
|---|---|---|
| Control modality | — | YES |
| Treated modality | 1 L/ha | NO |

8.2.3. Conclusion

This trial shows that when the slurry of the invention is applied to millet at a late stage of development, the treated plants benefit from improved stem strength. As a result, the treated plants are not recumbent and present improved leaf exposure compared to the recumbent plants in the control modality. Drone photography supports this observation. There are no areas of recumbent plants for the treated plants, contrary to the observations made for the untreated plants.

8.3. Wheat 8.3.1. Equipment and Methods 8.3.1.1. Description of the Experimental Setup The description of the experimental setup is presented in Table 26.

TABLE 26

| Trial | Wheat cultivated in wide strips |
|---|---|
| Crop (variety) | Wheat |
| Sowing density | 260 seeds/m$^2$ |
| Soil type | Sandy-loamy |
| Setup | Wide strips (0.12 ha) |

8.3.1.2. Modalities Considered

The description of the modalities considered is presented in Table 27.

TABLE 27

| Modality | Treatment | Application dose of the composition as per example 1 | Application stage |
|---|---|---|---|
| control | Untreated Control (UC) | — | — |
| treated | Composition according to example 1 | 1 L/ha, then 1 L/ha 14 days later | Flag leaf stage for the first application - Spike swelling for the second application |

The slurry is obtained by diluting the composition of example 1 in water and is applied by foliar spraying, at a volume of 80 L/ha under controlled conditions: temperature of 21° C. and wind at 5 km/h.

8.3.1.3. Data Collection Method

The plants in both study modalities are examined according to several parameters:

- stem height (between the crown and the ear insertion height). This is a destructive measurement performed on 10 plants per study modality, seven days after the second application of foliar spray.
- spike height (between the ear insertion height and the highest spikelet). This is a destructive measurement performed on 10 plants per study modality, 14 days after the second application of foliar spray.
- extent of lodging: visual observation of the damages caused by lodging, for each study modality.

8.3.1.4. Analysis

The average values of the heights of 10 stems and the heights of 10 spikes are evaluated for each study modality and then compared. For each measurement, a visual observation is carried out to evaluate the damage due to lodging.

8.3.2. Results

The results are summarized in Table 28.

TABLE 28

| | Average stem height at 7 days (cm) | Average spike height at 14 days (cm) | Damage due to lodging at 7 days, 14 days and 21 days |
|---|---|---|---|
| Control modality | 60.16 | 9.01 | NO |
| Double application of the slurry of the invention (application dose of the composition: 1 L/ha) | 65.24 | 10.17 | NO |

8.3.3. Conclusion

This trial shows that a double application of the slurry of the invention to wheat at a late stage of development leads initially to an early increase in stem height (about 5 cm), indicating that the development cycle has been shortened. Nevertheless, at this stage, no damage due to lodging is observed. An increased stem height therefore does not lead to damage due to lodging. The solidity of the stem must be improved in response to the application of the invention. In addition, the increased height of the spike observed for the treated modality increases the weight of the aerial tissues of the plant, with no damage due to lodging being noted. The conclusion is that the foliar application of the invention allows plants to better withstand physiological lodging.

9. Evaluation of the Capacity of the Slurry of the Invention to Reduce the Sensitivity of Cultivated Vine Plants to Mildew The objective of this trial is to evaluate the effect of the application of the slurry of the invention on the resistance of a plant to a biotic stress.

9.1. Equipment and Methods 9.1.1. Description of the Experimental Plot

The description of the experimental plot is presented in Table 29.

TABLE 29

| Crop (variety) | Vine (Ugni blanc) |
|---|---|
| Inter-row distance | 3 m |
| Inter-vine distance | 1.2 m |
| Experimental setup | Microplots with 7 vines, 4 repeated trials |

TABLE 29-continued

| Special features | Artificial contamination |
|---|---|
| Slurry dosage tested | 0.5 L/ha |

9.1.2. Modalities Considered

The description of the modalities considered is presented in Table 30.

TABLE 30

| Modality | Treatment | Application dose of the composition as per example 1 | Application stage |
|---|---|---|---|
| control | Untreated Control (UC) | — | — |
| treated | Composition according to example 1 | 0.5 L/ha | 7 applications between the inflorescence clearly visible (BBCH 53) and the pea-sized berry Stage (BBCH 75) |

It is important to note that the seven applications of the slurry of the invention correspond to the seven ordinary applications of fungicidal treatments to the vine. In other words, these seven applications of fungicidal treatments are replaced by the application of the slurry of the invention. Additionally, in the present case, the first application of the slurry of the invention is carried out prior to the onset of a biotic stress. This therefore constitutes a preventive treatment of the plant to limit the loss of dry matter related to a biotic stress.

9.1.3. Data Collection Method 9.1.3.1. Measurement of Disease Development

Disease development is evaluated through the use of two complementary indicators:

- frequency of the disease: percentage of bunches on which the disease is observed; and
- intensity of the disease (in %): average intensity of the disease for all bunches. The intensity on one bunch therefore corresponds to the surface area of the bunch that is covered by the disease (expressed in %).

The sample size is 200 individuals per study modality (or 50 per microplot).

9.1.3.2. Statistical Analysis

The statistical tests performed for this trial are:

- a Bonferroni test for frequencies equality (equal averages); and
- a Bonferroni test for intensities equality (equal averages).

9.1.4. Results

The results of the counts performed on the bunches are presented in FIG. 6.

9.1.4.1. Test for Frequencies Equality

The results of the Bonferroni test for frequencies equality are presented in Table 31.

TABLE 31

| Modality | Frequency observed on the bunches |
|---|---|
| Slurry as per example 1 | 63% |
| Control modality | 85% |
| Equal averages | Accepted (significant) |

These results indicate that the disease is significantly less prevalent on the bunches growing on the vine plants that have been treated with the slurry than on the bunches from the untreated modality.

9.1.4.2. Test for Intensities Equality
The results are presented in Table 32.

TABLE 32

| Modality | Intensity observed on the bunches |
|---|---|
| Slurry as per the invention | 11.58% |
| Control modality | 24.5% |
| Equal averages | Accepted (significant) |

These data show that the intensity of the disease observed on the bunches is significantly lower on the vine plants that have been treated with the slurry of the invention compared to those of the untreated control modality. In addition, this trial shows that the intensity of the disease can be decreased by 40% to 50% by applying the slurry of the invention to the vine.

10. Evaluation of the Potential Use of the Invention in Normal Agricultural Practice The objective of this trial is to demonstrate the usefulness of integrating the slurry of the invention into an operational technical route for protection against mildew. It can be compared with example 9, which aims to demonstrate the effect of applying the slurry of the invention obtained from the composition 1 in the context of an incomplete treatment program, i.e., one that does not correspond to the treatments ordinarily applied over the lifetime of the vine.

10.1. Equipment and Methods
10.1.1. Description of the Experimental Plot
The description of the experimental plot is presented in Table 33.

TABLE 33

| Crop (variety) | Vine (Ugni blanc) |
|---|---|
| Inter-row distance | 3 m |
| Inter-vine distance | 1.2 m |
| Experimental setup | Microplots with 9 vines, 4 repeated trials |
| Slurry dosage tested | 1 L/ha |

10.1.2. Modalities Considered
The description of the modalities considered is presented in Table 34.

TABLE 34

| Treatment | | Application dose of the composition of the invention | Stages of application |
|---|---|---|---|
| Control modality | 3 conventional treatments (flowering): Resplend, Profiler, Mildicut + 5 copper treatments in the pre- and post-flowering periods | — | — |
| Treated modality | 3 conventional treatments (flowering): Resplend, Profiler, Mildicut + 5 applications of the slurry of the invention in the pre- and post-flowering periods | 1 L/ha | 5 applications between the inflorescence clearly visible (BBCH 53) and the pea-sized berry stage (BBCH 75) |

10.1.3. Data Collection Method
10.1.3.1. Measurement of Disease Development
See part 9.1.3.1.
The evaluation is carried out for young leaves, old leaves and bunches. For each organ, the sample size is 400 individuals per study modality (or 100 per microplot).
10.1.3.2. Statistical Analysis
The statistical tests performed for this trial are:
a Kruskal-Wallis test for equal frequencies (equal medians); and
a Kruskal-Wallis test for equal intensities (equal medians).
The results of the counts performed on the leaves and bunches are presented in FIG. 7.

10.1.4. Results
10.1.4.1. Test for Frequencies Equality
The results are presented in Table 35.

TABLE 35

| Modality | Frequency observed on the leaves | Frequency observed on the bunches |
|---|---|---|
| Slurry as per the invention | 46% | 44% |
| Control modality | 42% | 43.5% |
| Equal medians | Rejected (non-significant) | Rejected (non-significant) |

These results indicate that the prevalence of the disease is equivalent for the plants that have been treated with the slurry of the invention and for those subjected to a conventional treatment program (non-significant difference). In other words, a conventional treatment ($Cu^{2+}$ and phytopharmaceutical products) and a treatment with the slurry of the invention are equally effective.

10.1.4.2. Test for Intensities Equality

The results are presented in Table 36.

TABLE 36

| Modality | Intensity observed on the leaves | Intensity observed on the bunches |
|---|---|---|
| Slurry as per the invention | 4.68% | 10.01% |
| Control modality | 4.36% | 8.24% |
| Equal medians | Rejected (non-significant) | Rejected (non-significant) |

These results indicate that the intensity of the disease is equivalent for the plants that have been treated with the slurry of the invention and for those subjected to a conventional treatment program (non-significant difference). In addition, it appears that the slurry of the invention offers the same degree of protection against mildew as does copper.

11. Agricultural Mixtures with Crop Protection Compounds. Example of Interaction Wheat/*Zymoseptoria tritici*

The objective of the trial is to demonstrate the difference in efficacy of protection of Cesario wheat against a pathogen responsible for the major leaf disease of wheat, *Zymoseptoria tritici*, by combining an application of the slurry of the invention into an operational technical route with reduced doses of fungicides. The fungicide treatment frequency index is reduced. The comparison is done with a reference control (a farmer's conventional fungicide application itinerary) and a likely control (fungicide dose reduction without application of the slurry of the invention).

11.1. Equipment and Methods 11.1.1. Description of the Experimental Plot

Two experiments were led.

The description of the experimental plot 1 is presented in Table 37.

TABLE 37

| | |
|---|---|
| Crop (variety) | Wheat (Cesario) |
| Sowing density | 260 seeds/m² |
| Cultural precedent | Corn |
| Soil type | Sandy-loamy |
| Experimental setup | Wide strips (0.12 ha). 1 repetition for each modality |
| Composition of example 1, dosage tested | 1 L/ha |

The description of the experimental plot 2 is presented in Table 38.

TABLE 38

| | |
|---|---|
| Crop (variety) | Wheat (Garcia) |
| Sowing density | 260 seeds/m² |
| Cultural precedent | Soyabeans |
| Soil type | Sandy-clay loamy |
| Experimental setup | Wide strips (0.6 ha). 2 repetitions for each modality |
| Composition of example 1, dosage tested | 1 L/ha |

11.1.2. Modalities Considered

The reduction of dose of fungicide applied is based on the last leaf stage (T2). The current dose applied by the farmer is 0.5 L/ha, the registration dose is 1.5 L/ha and the reduced dose tested is 0.1 L/ha. The fungicides targeted are respiration inhibitors (inhibitors of complex III at Qo site with pyraclostrobin and inhibitors of complex II with fluxapyroxad).

The reduction of dose of fungicide applied is based on the last leaf stage (T2). The current dose applied by the farmer is 1 L/ha, the registration dose is 1.5 L/ha and the reduced dose tested is 0.1 L/ha. The fungicides targeted are respiration inhibitors (inhibitors of complex II at Qo site with pyraclostrobin and inhibitors of complex II with fluxapyroxad) and sterol biosynthesis inhibitors (C14 demethylase inhibitors with metconazole).

The description of the modalities considered is presented in Table 39.

TABLE 39

| | | plot 1 | | | |
|---|---|---|---|---|---|
| | Treatment | Application dose of the composition 1 of the invention | Stages of application | Fungicide treatment frequency index on considered with treatment (T2) | Active ingredient with reduction of dose |
| Control modality | 3 conventional treatments: T1 at 2 nodes: 0.6 L/ha of Kromatik T2 at Last leaf stage: 0.5 L/ha of Priaxor T3 at Swelling of the ear: 0.6 L/ha of Amplitude | — | — | — | |
| Likely Control modality | 3 conventional treatments: T1 at 2 nodes: 0.6 L/ha of Kromatik | — | — | −80% | pyraclostrobin fluxapyroxad |

TABLE 39-continued plot 1

| Treatment | | Application dose of the composition 1 of the invention | Stages of application | Fungicide treatment frequency index on considered treatment (T2) | Active ingredient with reduction of dose |
|---|---|---|---|---|---|
| Treated modality | T2 at Last leaf stage: 0.1 L/ha of Priaxor 3 conventional treatments: T1 at 2 nodes: 0.6 L/ha of Kromatik T2 at Last leaf stage: 0.1 L/ha of Priaxor | 1 L/ha (dilution to 1.25% in water) | 1 application at T1 (2 nodes) OR 1 application at T2 (Last leaf stage) | −80% | pyraclostrobin fluxapyroxad |

TABLE 40 plot 2

| Treatment | | Application dose of the composition 1 of the invention | Stages of application | Fungicide treatment frequency index on considered treatment (T2) | Active ingredient with reduction of dose |
|---|---|---|---|---|---|
| Control modality | 3 conventional treatments including: T2 at Last leaf stage: 1 L/ha of Priaxor-Reimer | — | — | — | |
| Likely Control modality | 3 conventional treatments including: T2 at Last leaf stage: 0.1 L/ha of Priaxor-Relmer | — | — | −90% | pyraclostrobin fluxapyroxad |
| Treated modality | 3 conventional treatments including: T2 at Last leaf stage: 0.1 L/ha of Priaxor-Relmer | 1 L/ha (dilution to 1.25% in water) | 1 application at T2 (Last leaf stage) | −90% | pyraclostrobin fluxapyroxad metconazole |

11.1.3. Data Collection Method 11.1.3.1. Measurement of Disease Development

The evaluation is carried out for three leaf levels, from bottom to top, F3, F2 and F1 in plot 1 and one leaf level (F2) in plot 2. For each modality, 20 plants are observed by measures, and between 3 and 4 measures by modality. The disease intensity (percentage of leaf area showing symptoms) is taken into account as measure.

11.1.4. Results 11.1.4.1. Test for Intensities Equality

The results are presented in Table 41.

TABLE 41 plot 1

| Modality | Frequency observed on the F3 leaves* | Frequency observed on the F2 leaves* | Frequency observed on the F1 leaves* |
|---|---|---|---|
| Slurry as per the invention | −38% | −37% | −43% |

*in comparison with intensity observed for the Likely Control modality, for equivalent leaves

TABLE 42 plot 2

| Modality | Frequency observed on the F2 leaves* |
|---|---|
| Slurry as per the invention | −31% |
| Equal medians | Significant |

*in comparison with intensity observed for the Likely Control modality, for F2 leaves These results indicate that the intensity of the disease is lower for the plants that have been treated with the slurry of the invention and a reduced dose of fungicide (fungicide treatment frequency index reduced by half) in comparison with the application of reduced dose of fungicide alone whatever the reduction of dose.

11.1.4.2. Test for Yields

The results are presented in Table 43.

TABLE 43

| plot 1 | |
|---|---|
| Modality | Yield variation compared to a full dose reference** |
| Slurry as per the invention | −1% |

TABLE 44

| plot 2 | |
|---|---|
| Modality | Yield variation compared to a full dose reference** |
| Slurry as per the invention | −4.7% |

**Comparison of the yield on the modality having received the treatment described in Table 39 and Table 40 (associated with low dose fungicides) and the modality with a conventional treatment (full dose of fungicides without application of the slurry of the invention)

These results indicate that the yield loss by reducing the dose of fungicide in association with an application of the slurry of the invention, is minimal in comparison with the yield of the control modality, whatever the reduction of dose.

12.1. Equipment and Methods 12.1.1. Description of the Experimental Plot

The description of the experimental plot is presented in Table 45.

TABLE 45

| | |
|---|---|
| Field | Villebois-Lavalette |
| Crop (variety) | Vine (Ugni Blanc) |
| Sowing density | 2700 vines/m$^2$ |
| Soil type | Sandy-loamy |
| Experimental setup | Plot 1: Microplots with 9 vines, 4 repeated trials |
| | Plot 2: Plots with 30 vines, 2 repeated trials |
| Composition of example 1, dosage tested | 1 L/ha |

12.1.2. Modalities Considered

The flowering is protected by conventional fungicides. Before and after flowering, the dose of fungicides is reduced by 50%, and the composition of example 1 is added to the slurry at a dose of 1 b/ha. The associated fungicide is copper.

The description of the modalities considered is presented in Table 46.

TABLE 46

| Experiment plan | | | | | | |
|---|---|---|---|---|---|---|
| | Treatments during flowering | Treatments before and after flowering | Application dose of the composition of the invention | Stages of application | Fungicide treatment frequency index on considered treatment (before and after flowering) | Active ingredient with reduction of dose |
| Likely Control modality | Conventional fungicides | Half dose of copper | — | — | −50% | Copper |
| Treated modality | Conventional fungicides | Half dose of copper + composition of example 1 | 1 L/ha | Plot 1: 2 before flowering and 3 after flowering Plot 2: 4 before flowering and 3 after flowering | −50% | Copper |
| Control modality | Conventional fungicides | Full dose of copper | — | | | |

12. Agricultural Mixtures with Crop Protection Compounds. Example of Interaction Vine/*Plasmopara viticola*

The objective of the trial is to demonstrate the difference in efficacy of protection of vine against a pathogen responsible for the downy mildew of the vine, *Plasmopara viticola*, by combining an application of the slurry of the invention into an operational technical route with reduced doses of fungicides. Thus, the fungicide treatment frequency index (FTI) can be reduced. The comparison is done with a likely control (fungicide dose reduction without application of the slurry of the invention).

12.1.3. Data Collection Method

Measurement of Disease Development

The evaluation is carried out on bunches. For each experimental setup, 50 bunches are observed by measures. Disease development is evaluated through the use of two complementary indicators:

- frequency of the disease: percentage of bunches on which the disease is observed; and
- intensity of the disease (in %): average intensity of the disease for all bunches. The intensity on one organ therefore corresponds to the surface area of the organ that is covered by the disease (expressed in %).

12.1.4. Results
12.1.4.1. Test for Intensities Equality
The results are presented in Table 47.

TABLE 47

Disease evaluation

| Modality | Frequency observed on bunches* | Intensity observed on bunches* |
|---|---|---|
| Slurry as per the invention 1 | PLOT 1: −29.6%<br>PLOT 2: 0% | PLOT 1: −40.6%<br>PLOT 2: −15.1% |

*in comparison with intensity observed for the Likely Control modality, for equivalent organ These results indicate that the intensity of the disease is lower for the plants that have been treated with the slurry of the invention and a reduced dose of fungicide (fungicide treatment frequency index reduced by half) in comparison with the application of reduced dose of fungicide alone.

12.1.4.2. Test for Yields
The results are presented in Table 48.

TABLE 48

Yield results

| Modality | Yield variation compared to a low dose alone * | Yield variation compared to a full dose reference** |
|---|---|---|
| Slurry as per the invention 1 | PLOT 1: −4%<br>PLOT 2: +9% | PLOT 1: +8%<br>PLOT 2: −9% |

* In comparison with the yield on the likely control modality (low dose of fungicides without application of the slurry of the invention)
**In comparison with the yield on the modality with a conventional treatment (full dose of fungicides without application of the slurry of the invention)

These results are fluctuating but not significant, which indicates that the yield loss by reducing the dose of fungicide in association with an application of the slurry of the invention, is minimal in comparison with the yield of the control modality.

12.1.5. Conclusion
The development of the disease is lower on the modalities that received the treatment described (application of the slurry of the invention combined with low-dose fungicides) than on the modalities that received the same treatment without application of the slurry of the invention (low-dose fungicide alone). Thus, the application of the slurry of the invention increases the efficacy of the fungicide molecules or complements their action, thus ensuring better efficacy for a reduced dose treatment.

The addition of the slurry of the invention to the fungicide spray mix decreases the concentration of the fungicide, and therefore greatly reduces the fungicide treatment frequency index for these treatments without significantly affecting yield.

Thus, these trials allow us to conclude that when the slurry of the invention is mixed with a fungicide mixture containing "active ingredients", it increases their effectiveness or acts as a complement to them, and thus greatly reduces the fungicide treatment frequency index while maintaining a good sanitary condition and ensuring a good yield.

13. Comparison of the Protection's Efficiency of an Emulsion Versus Suspo-Emulsion Against *Plasmopara viticola*

The main objective was to investigate the ability of the slurry as per example 1 and the same formulation but without any SF2 sucrose ester, to induce a protection in grapevine against the biotrophic oomycete *Plasmopara viticola*, the causal agent of downy mildew.

Grapevine leaves are sprayed with the slurry of example 1 and the equivalent but without SF2 free sucrose esters to the point of runoff. The control plants are treated with an equivalent volume of ultrapure water. Forty-eight hours after treatments, a suspension of sporangia adjusted to $2.10^4$ sporangia/mL is sprayed on the lower surface of the leaves. The plants were placed in a humid chamber (relative humidity between 90% and 100%, temperature between 18 and 23° C.) in the dark for one night. Six days after inoculation, "oil spot" symptoms appeared on the adaxial side of the leaves. Five leaf discs (011 mm) per leaf (i.e. 40 discs per modality) were taken and placed face up against a damp Whatman paper in a Plexiglas box (relative humidity between 90 and 100%). The device was placed in the dark overnight at 20-22° C. to induce sporulation. The percentage of sporulation on each leaf disc was assessed using Visilog 6.9 software.

TABLE 49

The values in parentheses are the weight percent concentration of the molecules.

| | Water | Example 1 (suspo-emulsion) | Example 1 without SF2 free sucrose esters (emulsion) |
|---|---|---|---|
| Composition of the examples | Water (100) | Phytosterols (2.5), sucrose stearate (6 + 2), PEG 200 (3.5), methyl tetradecanoate (0.4), benzyl alcohol (0.7), water (84.9) | Phytosterols (2.5), sucrose stearate (6), PEG 200 (3.5), methyl tetradecanoate (0.4), benzyl alcohol (0.7), water (86.9) |
| Sporulation area (%) | 10.62 | 3.29 | 6.66 |

Both slurries prepared from the emulsion or the suspo-emulsion of example 1 and applied 48 h before pathogen inoculation reduced the sporulation of *P. viticola* on grapevine leaves, compared with control leaf disks. Surprisingly, the suspo-emulsion from example 1 induced a stronger protection than did the treatment from the emulsion, as seen in Table 49.

14. Evaluation of the Capacity of the Slurry as Per Example 1 to Reduce the Sensitivity of a Maize to Water Stress Under Real Conditions Versus Emulsion The main objective was to investigate the ability of the slurry as per example 1 and the same formulation but lacking free sucrose esters, to induce a hydric stress protection on maize grown on real field. The yield was estimated for a non-controlled modality, a modality treated with a slurry prepared from the emulsion as per example 1 (which means without SF2 free sucrose esters) and another modality treated with a slurry prepared from the suspo-emulsion as per example 1 The yield was estimated for these three modalities. Table 52 summarizes the trials.

14.1. Equipment and Methods 14.1.1. Description of the Experimental Setup

The description of the experimental setup is presented in Table 50.

TABLE 50

| | |
|---|---|
| Crop (variety) | DK4670 |
| Sowing density | 80,000 |
| Setup | Wide strips (0.3 ha) for both the untreated (control) modality and the treated modality |

14.1.2. Modalities Considered

The description of the modalities considered is presented in Table 51.

TABLE 51

| Modality | Treatment | Application dose of the composition as per example 1 | Application stage |
|---|---|---|---|
| control | Untreated Control (UC) | — | — |
| treated | Composition according to the example 1 (suspo-emulsion) | 1 L/ha | V10 |
| treated | Composition according to the example 1 but without SF2 (emulsion) | 1 L/ha | V10 |

The slurry is obtained by diluting the composition of example 1 in water and is applied only once, by foliar spraying, at a volume of 80 L/ha under the following conditions: temperature of 22° C., relative humidity of 75% and no wind.

14.1.3. Data Collection Method

Real-Time Estimation of the Weight of the Corn Harvested.

14.2. Results

The results are given in Table 52.

TABLE 52

| Modality | Yield |
|---|---|
| Control modality | 115.4 |
| Emulsion-treated modality | 114.6 |
| Suspo-emulsion-treated modality | 118.0 |

15. Preparation of the Composition According to the Invention Comprising Boric Acid and Sodium Molybdate The composition (example 10) is given in Table 53:

TABLE 53

| Compound (example 10) | Quantity (in wt %) |
|---|---|
| Phytosterols, CAS: 949109-75-5 | 2.5 |
| Sucrose stearate, CAS: 84066-95-5 | 6 (OIL SF1) + 2 (SF2) |
| Polyethylene glycol, molar mass 400 g/mol | 3.5 |
| Methyl tetradecanoate | 0.4 |
| Water | 84.9 |
| Benzyl alcohol | 0.7 |
| Boric acid | 1.5 |

TABLE 53-continued

| Compound (example 10) | Quantity (in wt %) |
|---|---|
| Sodium molybdate dihydrate | 0.25 |
| Dv90 suspo-emulsion | 80 |

(i) Preparation at about 110° C. of a lipophilic phase comprising phytosterols, sucrose stearate, polyethylene glycol 400, and the methyl tetradecanoate,
(ii) Preparation at about 80° C. of a hydrophilic phase comprising benzyl alcohol, boric acid and sodium molybdate dihydrate in water
(iii) Mixing the lipophilic phase of step (i) and the water of step (ii) and stirring until at least 90% of lipophilic droplets having a diameter comprised between 0.1 and 20 μm, with a peak maximum between 0.5 and 7 μm as determined by laser diffraction is obtained,
(iv) Cooling of the emulsion to ambient temperature of about 20° C., and
(v) Adding sucrose stearate in the emulsion, at ambient temperature of about 20° C. until at least 90% of the particles with a diameter comprised between 10 and 250 μm are obtained and suspended in the aqueous phase, with a maximum peak between 10 μm and 1000 μm as determined by laser diffraction.

16. Evaluation of the Capacity of the Slurry as Per Example 1 (See Table 1) and Example 10 (See Table 53) to Reduce the Sensitivity of a Soybean Crop to Water Stress The objective is to evaluate soybean yield in field trials with plantations carried out with seeds subjected to hydric stress and treated with foliar application of the compositions of example 1 and 10 at different stages.

16.1. Equipment and Methods 16.1.1. Description of the Experimental Setup

The description of the experimental setup is presented in Table 54.

TABLE 54

| | |
|---|---|
| Crop (variety) | Soybean (TMG 2383) |
| Sowing density | 13 plants/m² |
| Soil type | Clayish |
| Setup | 20 strips of 10 m², 5 modalities per trial fertilization prior to sowing with KCl and simple superphosphate |

16.1.2. Treatment Modalities Considered

The description of the modalities considered is presented in Table 55.

TABLE 55

| Modality | Treatment | Application dose of the composition | Application stage |
|---|---|---|---|
| control | Untreated Control (UC) | — | — |
| treated #1 | Composition according to the example 1 | 2 L/ha | Between V3 and V4 stage |
| treated #2 | Composition according to the example 10 | 2 L/ha | Between V3 and V4 stage |

The yield is being considered in this study.

16.2. Results

The results are presented in Table 56.

TABLE 56

| Treatment modality | Yield (relative to a hundred % for control modality) |
|---|---|
| Control modality | 100.00 |
| Treated modality (composition as per example 1 | 104.39 |
| Treated modality (composition as per example 10) | 110.93 |

16.3. Conclusion

This trial shows that when the slurry of the invention is applied to soybean at an early stage of development (between V3 and V4 stage), the yield is improved for both compositions according to the preparation of example 1, but mostly for the composition according to the preparation of example 10.

This evidence shows that under identical growth conditions, a plant that has been treated with the slurry of the invention (whether the slurry is obtained from example 1 or from example 10) optimizes its consumption of soil water in order to increase its grain production and limit its desiccation.

The invention claimed is:

1. A multiphase agricultural composition in the form of a suspo-emulsion, comprising:
    lipophilic droplets containing a mixture of phytosterols, wherein the lipophilic droplets are dispersed in an aqueous phase to form an oil-in-water emulsion,
    wherein the mixture of phytosterols comprises β-sitosterol present in at least 30% by weight of the mixture of phytosterols, with the balance of the mixture to 100% comprising campesterol, stigmasterol and brassicasterol; and
    wherein the mixture of phytosterols is between 0.2% and 10% of the composition by weight;
    at least one first surfactant located at the interface of the lipophilic droplets and the aqueous phase; and
    at least one second surfactant suspended in the phase oil-in-water emulsion, wherein the at least one second surfactant is in the form of particles insoluble in the oil-in-water emulsion,
    wherein the at least one first surfactant and the at least one second surfactant each independently comprise sucrose stearate, or sucrose palmitate, or a mixture thereof; and
    wherein the at least one first surfactant is between 0.2% and 10% of the composition by weight, and the at least one second surfactant is between 0.01% and 5% of the composition by weight.

2. The composition of claim 1, wherein the mixture of phytosterols is between 1% and 5% of the composition by weight.

3. The composition of claim 1, wherein the weight ratio of the mixture of phytosterols to the at least one first surfactant and the at least one second surfactant is between 0.1 and 5.

4. The composition of claim 1, wherein at least 90% of lipophilic droplets dispersed in the aqueous phase have a diameter between 0.1 µm and 20 µm, with a peak maximum between 2 µm and 6 µm, as determined by laser diffraction, and
    wherein at least 90% of the at least one second surfactant is in the form of particles that have a diameter between 10 µm and 250 µm, with a peak maximum between 10 µm and 100 µm as determined by laser diffraction.

5. The composition of claim 1, wherein the at least one first surfactant and the at least one second surfactant have the same composition.

6. The composition of claim 5, wherein the at least one first surfactant and the at least one second surfactant both comprise a mixture of sucrose stearate and sucrose palmitate.

7. The composition of claim 6, wherein the mixture contains:
    between 20% and 80% by weight of sucrose stearate with a monoester content ranging between 20% and 80% by weight of sucrose stearate, with the balance further comprising a mixture of di-, tri- and/or polyesters; and
    between 20% and 80% by weight of sucrose palmitate with a monoester content ranging between 20% and 80% of sucrose palmitate, with the balance further comprising a mixture of di-, tri- and/or polyesters.

8. The composition of claim 7, wherein the mixture contains:
    70% by weight of sucrose stearate with a monoester content of 70% by weight of sucrose stearate, with the balance further comprising a mixture of di-, tri- and/or polyesters; and
    30% by weight of sucrose palmitate with a monoester content of 70% by weight of sucrose palmitate, with the balance further comprising a mixture of di-, tri- and/or polyesters.

9. The composition of claim 8, wherein the at least one first surfactant is between 3% and 7% of the composition by weight, and the at least one second surfactant is between 0.1% and 2.5% of the composition by weight.

10. The composition of claim 1, further comprising: at least one wetting agent.

11. The composition of claim 10, wherein the at least one wetting agent comprises at least one fatty acid methyl ester.

12. The composition of claim 11, wherein the at least one wetting agent comprises methyl tetradecanoate, methyl hexadecanoate, or methyl octadecanoate, or any mixture thereof.

13. The composition of claim 11, wherein the at least one wetting agent comprises methyl tetradecanoate, methyl hexadecanoate, and methyl octadecanoate.

14. The composition of claim 11, wherein the at least one wetting agent is between 0.01% and 5% of the composition by weight.

15. The composition of claim 1, further comprising: at least one fluidifying agent.

16. The composition of claim 15, wherein the at least one fluidifying agent comprises polyethylene glycol.

17. The composition of claim 15, wherein the at least one fluidifying agent comprises polyethylene glycol having an average molecular weight between 200 Da and 8000 Da.

18. The composition of claim 15, wherein the at least one fluidifying agent is between 1% and 15% of the composition by weight.

19. The composition of claim 1, further comprising: at least one chelating agent.

20. The composition of claim 19, wherein the at least one chelating agent is between 0.01% and 5% of the composition by weight.

21. The composition of claim 1, further comprising: at least one preservative.

22. The composition of claim 21, wherein the at least one preservative is between 0.01% and 5% of the composition by weight.

23. The composition of claim 1, further comprising: a phytopharmaceutical product, a biocontrol product, or a nutrient, or a combination thereof.

24. The composition of claim 23, wherein the nutrient comprises boron, molybdenum, or a combination thereof.

25. The composition of claim 1, wherein:
    the mixture of phytosterols is between 1% and 5% of the composition by weight;
    the at least one first surfactant and the at least one second surfactant both comprise a mixture containing:
        between 20% and 80% by weight of sucrose stearate with a monoester content ranging between 20% and 80% by weight of sucrose stearate, with the balance further comprising a mixture of di-, tri- and/or polyesters; and
        between 20% and 80% % by weight of sucrose palmitate with a monoester content ranging between 20% and 80% of sucrose palmitate, with the balance further comprising a mixture of di-, tri- and/or polyesters;

the weight ratio of the mixture of phytosterols to the at least one first surfactant and the at least one second surfactant is between 0.1 and 5; and the composition comprises at least one wetting agent comprising at least one fatty acid methyl ester.

26. The composition of claim 25, further comprising:
at least one fluidifying agent comprising polyethylene glycol;
and wherein the at least one wetting agent is between 0.01% and 5% of the composition by weight.

27. A method of producing the composition of claim 1, comprising:
preparing a lipophilic phase by heating a mixture of phytosterols;
providing and heating an aqueous phase;
adding at least one first surfactant that is soluble in oil to the lipophilic phase and/or adding at least one first surfactant that is soluble in water to the aqueous phase, wherein the first surfactant is added to the lipophilic phase and/or aqueous phase at a temperature at which the first surfactant becomes soluble;
mixing the lipophilic phase with the aqueous phase until an emulsion is obtained;
cooling the emulsion; and
adding at least one second surfactant to the cooled emulsion, while stirring at a temperature between 20° C. and 25° C. until a homogeneous suspension of solid particles in the emulsion is obtained, thereby producing the composition of claim 1.

28. The method of claim 27, wherein the temperature at which the first surfactant becomes soluble is between about 50° C. and about 140° C.

29. The method of claim 28, wherein the temperature at which the first surfactant becomes soluble is between about 90° C. and about 120° C.

30. A method of treating a cultivated plant, comprising: applying to the plant a slurry comprising the composition of claim 1 diluted in water, prior to onset of an abiotic stress, to limit loss of dry matter related to the abiotic stress.

31. The method of claim 30, wherein the plant is a corn plant.

32. A multiphase agricultural composition in the form of a suspo-emulsion, comprising:
lipophilic droplets containing a mixture of phytosterols, wherein the lipophilic droplets are dispersed in an aqueous phase to form an oil-in-water emulsion,
wherein the mixture of phytosterols comprises ß-sitosterol present in at least 30% by weight of the mixture of phytosterols, with the balance of the mixture to 100% comprising campesterol, stigmasterol and brassicasterol; and
wherein the mixture of phytosterols is between 0.2% and 10% of the composition by weight;
at least one first surfactant located at the interface of the lipophilic droplets and the aqueous phase; and
at least one second surfactant suspended in the oil-in-water emulsion, wherein the at least one second surfactant is in the form of particles insoluble in said emulsion,
wherein the at least one first surfactant and the at least one second surfactant each independently comprise sucrose stearate, or sucrose palmitate, or a mixture thereof;
wherein the at least one first surfactant is between 0.2% and 10% of the composition by weight, and the at least one second surfactant is between 0.01% and 5% of the composition by weight;
at least one preservative; and
at least one fluidifying agent.

33. The composition of claim 32, wherein
the mixture of phytosterols is between 1% and 5% of the composition by weight;
the at least one first surfactant and the at least one second surfactant each comprise sucrose stearate;
the preservative is between 0.01% and 5% of the composition by weight and comprises benzyl alcohol; and
the fluidifying agent is between 0.01% and 5% of the composition by weight and comprises polyethylene glycol having an average molecular weight between 200 Da and 8000 Da; and
wherein the composition further comprises a wetting agent, wherein the wetting agent is between 0.01% and 5% of the composition by weight and comprises methyl tetradecanoate, methyl hexadecanoate, or methyl octadecanoate, or any mixture thereof.

* * * * *